US009841215B2

(12) United States Patent
Tsubouchi

(10) Patent No.: US 9,841,215 B2
(45) Date of Patent: Dec. 12, 2017

(54) ABSORPTION HEAT PUMP APPARATUS

(71) Applicant: AISIN SEIKI KABUSHIKI KAISHA, Kariya-shi (JP)

(72) Inventor: Osamu Tsubouchi, Chiryu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 375 days.

(21) Appl. No.: 14/572,023

(22) Filed: Dec. 16, 2014

(65) Prior Publication Data

US 2015/0168029 A1    Jun. 18, 2015

(30) Foreign Application Priority Data

Dec. 16, 2013 (JP) ................................ 2013-259290

(51) Int. Cl.
*F25B 15/00* (2006.01)
*F25B 27/02* (2006.01)
(Continued)

(52) U.S. Cl.
CPC .............. *F25B 27/02* (2013.01); *F25B 37/00* (2013.01); *F25B 39/026* (2013.01); *F25B 15/04* (2013.01);
(Continued)

(58) Field of Classification Search
CPC ........ F25B 37/00; F25B 39/026; F25B 15/04; F25B 15/06; F25B 15/004; F25B 2315/001; Y02B 30/62; B01F 7/00308; F28D 3/04
See application file for complete search history.

(56) References Cited

U.S. PATENT DOCUMENTS

| 5,622,060 A | 4/1997 | Kang |
| 8,506,156 B2 | 8/2013 | Tsubouchi et al. |
| 2013/0062794 A1* | 3/2013 | Tsubouchi .............. F25B 37/00 261/140.2 |

FOREIGN PATENT DOCUMENTS

| JP | 04-236079 A | 8/1992 |
| JP | H06-201222 A | 7/1994 |

(Continued)

OTHER PUBLICATIONS

Office Action (Notification of Reasons for Refusal) dated Aug. 22, 2017, by the Japanese Patent Office in corresponding Japanese Patent Application No. 2013-259290, and an English Translation of the Office Action. (8 pages).

*Primary Examiner* — Elizabeth Martin
(74) *Attorney, Agent, or Firm* — Buchanan Ingersoll & Rooney PC

(57) ABSTRACT

An absorption heat pump apparatus absorbing refrigerant vapor using absorption liquid includes a container having a liquid storage portion storing a solution made of absorption liquid or a refrigerant; a heat exchanger installed in the container, and through which a heat exchange fluid flows; a pumping member pumping the solution in the liquid storage portion upward using the rotation thereof; and a coating member rotating integrally with the pumping member, and provided so as to radially extend outward from the center of rotation of the pumping member, and coating an outer surface of the heat exchanger with the solution pumped upward, wherein while the solution pumped upward moves to the center of rotation due to the rotation of the pumping member, and then radially moves outward from the center of rotation, the outer surface of the heat exchanger is coated with the solution through the coating member.

10 Claims, 13 Drawing Sheets

(51) Int. Cl.
*F25B 37/00* (2006.01)
*F25B 39/02* (2006.01)
F25B 15/04 (2006.01)
F25B 15/06 (2006.01)
F25B 30/04 (2006.01)

(52) U.S. Cl.
CPC ............... *F25B 15/06* (2013.01); *F25B 30/04* (2013.01); *Y02B 30/625* (2013.01)

(56) References Cited

FOREIGN PATENT DOCUMENTS

| | | |
|---|---|---|
| JP | H08-054158 A | 2/1996 |
| JP | H10-500764 A | 1/1998 |
| JP | 2011-033236 A | 2/2011 |
| WO | WO 2011/158432 A1 | 12/2011 |

* cited by examiner

ABSORPTION HEAT PUMP APPARATUS

CROSS REFERENCE TO RELATED APPLICATIONS

This application is based on and claims priority under 35 U.S.C. §119 to Japanese Patent Application 2013-259290, filed on Dec. 16, 2013, the entire contents of which are incorporated herein by reference.

TECHNICAL FIELD

This disclosure relates to an absorption heat pump apparatus.

BACKGROUND DISCUSSION

The related art discloses an absorption heat pump apparatus or the like that performs an air heating and cooling conditioning operation by using a large quantity of absorption liquid capable of absorbing refrigerant vapor which is formed due to the evaporation of a refrigerant, and by using the heat of vaporization of the refrigerant and the heat of condensation of the refrigerant (for example, refer to JP 4-236079A (Reference 1)).

JP 4-236079A (Reference 1) discloses an absorption refrigerator (absorption heat pump apparatus) that includes a regenerator, a condenser, an evaporator, and an absorber. In the absorption refrigerator disclosed in JP 4-236079A (Reference 1), the absorber is provided with a heat exchanger which has a circular arc-shaped heat transfer surface which is convex upward, and through which cooling water flows; blades (coating member) that have a rotating shaft disposed opposite to the circular arc-shaped heat transfer surface; and a nozzle that supplies a concentrated solution (absorption liquid) to a ceiling portion of the heat exchanger. With the configuration of the absorber, when the concentrated solution, which is supplied to the ceiling portion of the heat exchanger through the nozzle, flows naturally downward on the heat transfer surface, the blades rotate about the rotating shaft, and thereby the concentrated solution spreads over the heat transfer surface, and a uniform film is formed. Accordingly, the concentrated solution formed into a thin film is diluted by absorbing refrigerant vapor from the evaporator, and the heat of absorption produced by the dilution of the concentrated solution is taken away through the heat transfer surface by the cooling water. Refrigerant vapor is more absorbed by the concentrated solution cooled on the heat transfer surface. With the configuration of the absorber, the concentrated solution is spread over the heat transfer surface by the rotating blades, and is diluted by absorbing the refrigerant vapor, and then the concentrated solution is delivered directly to the outside of the absorber from a lower end portion of the heat exchanger through a diluted solution outlet.

In the absorber of the absorption refrigerator disclosed in JP 4-236079A (Reference 1), since the concentrated solution is spread over the heat transfer surface of the heat exchanger by the rotating blades, and is diluted by absorbing the refrigerant vapor from the evaporator, and then the concentrated solution is delivered directly to the outside of the absorber from the lower end portion of the heat transfer surface through the diluted solution outlet, there is a high possibility that the diluted solution may be sent (recovered) to the outside of the absorber while the refrigerant vapor is not sufficiently absorbed due to the stay of the diluted solution (absorption liquid) in the absorber for an insufficient period of time. At this time, in order to ensure the performance of the absorber (performance of the heat exchanger for cooling the absorption liquid), the following method may be implemented: a circulation pump (solution pump) and a solution circulation circuit are separately provided, and the absorption liquid flowing downward to the lower end portion of the heat exchanger is pumped upward and re-supplied to the ceiling portion of the heat exchanger. However, there is a problem in that the separate provision of the circulation pump and the solution circulation circuit leads to an increase in the size of the absorption refrigerator (absorption heat pump apparatus) including the absorber.

SUMMARY

Thus, a need exists for an absorption heat pump apparatus which is not suspectable to the drawback mentioned above.

An aspect of this disclosure is directed to an absorption heat pump apparatus that absorbs refrigerant vapor using absorption liquid, the apparatus including: a container that has a liquid storage portion which stores a solution made of absorption liquid or a refrigerant; a heat exchanger which is installed in the container, and through which a heat exchange fluid flows; a pumping member that pumps the solution in the liquid storage portion upward using the rotation thereof; and a coating member that rotates integrally with the pumping member, and is provided so as to radially extend outward from the center of rotation of the pumping member, and coats an outer surface of the heat exchanger with the solution pumped upward by the pumping member. While the solution pumped upward by the pumping member moves to the center of rotation due to the rotation of the pumping member, and then radially moves outward from the center of rotation, the outer surface of the heat exchanger is coated with the solution through the coating member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of this disclosure will be described with reference to the accompanying drawings.

First Embodiment

First, the configuration of an absorption heat pump apparatus 100 according to a first embodiment of this disclosure will be described with reference to FIGS. 1 to 7. In the absorption heat pump apparatus 100 according to the first embodiment, water is used as a refrigerant and a lithium bromide (LiBr) aqueous solution is used as absorption liquid. The absorption heat pump apparatus 100 is mounted in a vehicle equipped with an engine (internal combustion engine) 90 such as a passenger vehicle, a bus, or a truck, and is applied to an indoor air conditioning system for a vehicle.

Figure 1:
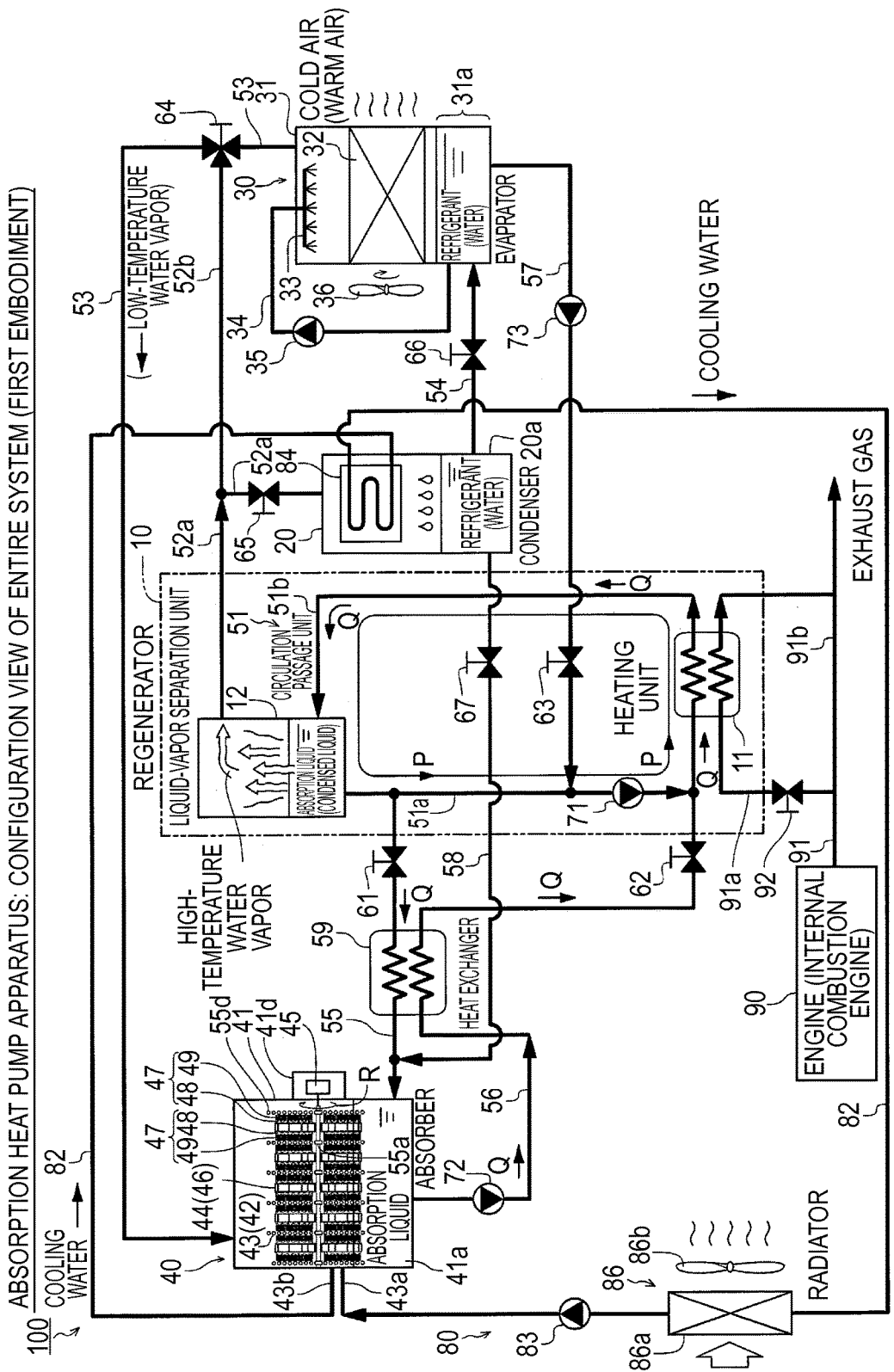
FIG. 1 is a view illustrating the entire configuration of an absorption heat pump apparatus according to a first embodiment of this disclosure.

As illustrated in FIG. 1, the absorption heat pump apparatus 100 includes a regenerator 10 (portion in a frame depicted by the two-dotted chain line in FIG. 1); a condenser 20; an evaporator 30; and an absorber 40. The regenerator 10 includes a heating unit 11 that heats the absorption liquid, and a liquid-vapor separation unit 12 that separates refrigerant vapor (high-temperature water vapor) from the heated absorption liquid.

The heating unit 11 is a plate type heat exchanger, and serves to heat the absorption liquid using the heat of exhaust gas from the engine 90. Typically, the absorption liquid is made by diluting LiBr concentrated liquid with the refrigerant (water), and the diluted absorption liquid flows through the heating unit 11. The liquid-vapor separation unit 12 serves to separate refrigerant vapor (high-temperature water vapor) from the absorption liquid heated by the heating unit 11. During a cooling operation, the condenser 20 serves to condense (liquify) the refrigerant vapor separated by the liquid-vapor separation unit 12. During a cooling operation, under low temperature and low pressure conditions, the evaporator 30 serves to evaporate (vaporize) the refrigerant turned into condensed water. The absorber 40 serves to absorb refrigerant vapor (low-temperature water vapor) that is obtained when the absorption liquid supplied in a condensed state evaporates in the evaporator 30. The LiBr condensed liquid is an example of the "absorption liquid" of this disclosure.

The absorption heat pump apparatus 100 includes a circulation passage unit 51 formed of absorption liquid circulation tube conduits 51a and 51b; refrigerant vapor delivery tube conduits 52a, 52b, and 53; a refrigerant delivery tube conduit 54; absorption liquid delivery tube conduits 55 and 56; and refrigerant supply tube conduits 57 and 58. The circulation passage unit 51 serves to circulate the absorption liquid between the heating unit 11 and the liquid-vapor separation unit 12 along a direction of arrow P without allowing the absorption liquid to flow through the absorber 40. A pump 71 is provided in the absorption liquid circulation tube conduit 51a, and circulates the absorption liquid (condensed liquid) in the liquid-vapor separation unit 12, from which refrigerant vapor is separated, through the circulation passage unit 51. A valve 61 is provided in the absorption liquid delivery tube conduit 55 that branches off from the absorption liquid circulation tube conduit 51a toward the absorber 40, and the valve 61 shuts off the flow of the circulating absorption liquid into the absorber 40 from the circulation passage unit 51 under predetermined conditions.

A pump 72 and a valve 62 are provided in the absorption liquid delivery tube conduit 56. Here, the pump 72 supplies the absorption liquid (LiBr aqueous solution) in the absorber 40, by which refrigerant vapor is absorbed, to the circulation passage unit 51, and the valve 62 shuts off the flow of the absorption liquid into the circulation passage unit 51 under predetermined conditions. The refrigerant supply tube conduit 57 is provided so as to directly supply the refrigerant (condensed water) in the evaporator 30 to the circulation passage unit 51 during a heating operation. A pump 73 and a valve 63 are provided in the refrigerant supply tube conduit 57, and the pump 73 supplies the refrigerant (condensed water) in the evaporator 30 to the circulation passage unit 51. During a cooling operation, when the pump 73 is stopped, the valve 63 is closed, and serves to shut off the reverse flow (mixing) of the circulating absorption liquid in the circulation passage unit 51 into the evaporator 30 through the refrigerant supply tube conduit 57.

Accordingly, immediately after the cooling operation is started, the absorption heat pump apparatus 100 quickly increases the temperature of the absorption liquid by starting the pump 71 with the valves 61 and 62 closed, circulating the absorption liquid through only the circulation passage unit 51, and using the heating unit 11. When refrigerant vapor separated by the liquid-vapor separation unit 12 reaches a predetermined temperature, the valves 61 and 62 are opened, and the pump 72 is started. Accordingly, a part of the heated absorption liquid (LiBr condensed liquid stored in the liquid-vapor separation unit 12) also flows through the absorption liquid delivery tube conduits 55 and 56 in a direction of arrow Q, and thereby a cooling cycle is formed. While a heating operation is performed, the valves 61 and 62 are normally closed, and the absorber 40 is not used. In contrast, immediately after a heating operation is started, an operation is performed so as to increase the temperature of the absorption liquid that circulates through the circulation passage unit 51, and refrigerant vapor (high-temperature water vapor) separated by the liquid-vapor separation unit 12 flows into the evaporator 30 (at this time, the condenser).

The refrigerant vapor delivery tube conduit 52b is provided so that the refrigerant vapor separated by the liquid-vapor separation unit 12 can directly flow into the evaporator 30 therethrough. Specifically, the refrigerant vapor delivery tube conduit 52b branches off from the refrigerant vapor delivery tube conduit 52a, and then is connected to the refrigerant vapor delivery tube conduit 53 that is connected to the evaporator 30 and the absorber 40. A three-way valve 64 is provided at the confluence of the refrigerant vapor delivery tube conduit 53 and the refrigerant vapor delivery tube conduit 52b so that the three-way valve 64 can switch between a first flow path and a second flow path. Here, the first flow path connects the evaporator 30 and the absorber 40, and the second flow path connects the liquid-vapor separation unit 12 and the evaporator 30. Accordingly, the switching of the three-way valve 64 to the first flow path (for a cooling operation) opens the path of the refrigerant vapor delivery tube conduit 53, through which refrigerant vapor (low-temperature water vapor), which is formed due to the evaporation of the refrigerant (condensed water) in the evaporator 30, is supplied to the absorber 40. In contrast, the switching of the three-way valve 64 to the second flow path (for a heating operation) opens the path of the refrigerant vapor delivery tube conduit 52b, from which refrigerant vapor separated by the liquid-vapor separation unit 12 directly flows into the evaporator 30 (at this time, the condenser). A valve 65 is provided in the refrigerant vapor delivery tube conduit 52a. During a heating operation, the valve 65 serves to shut off the flow of refrigerant vapor separated by the liquid-vapor separation unit 12 into the condenser 20.

A valve 66 is provided in the refrigerant delivery tube conduit 54, and the valve 66 is opened during a cooling operation, and is closed during a heating operation. During a heating operation, when the three-way valve 64 is switched to the second flow path (flow path which is formed when refrigerant vapor flows through the refrigerant vapor delivery tube conduit 52b) that connects the liquid-vapor separation unit 12 and the evaporator 30, and the valves 65 and 66 are closed, the condenser 20 is isolated from the cycle. Accordingly, during the heating operation, substantially the entirety of refrigerant vapor separated by the liquid-vapor separation unit 12 flows into the evaporator 30 through the refrigerant vapor delivery tube conduit 52b.

The refrigerant supply tube conduit 58 is provided so that the refrigerant (condensed water) in the condenser 20 can be directly supplied to the absorber 40 therethrough. A valve 67 is provided in the refrigerant supply tube conduit 58. When the apparatus is stopped after a cooling operation, the valve 67 is opened, and a part of the refrigerant (water) in the condenser 20 is supplied to the absorber 40, and thus the absorption liquid including the absorption liquid in the absorber 40 is diluted with the refrigerant. Accordingly, even when the absorption heat pump apparatus 100 is stopped, the absorption liquid, which stays in the inner portions of the apparatus including the circulation passage unit 51, and the absorption liquid delivery tube conduits 55 and 56, is prevented from being crystallized.

As illustrated in FIG. 1, the absorption heat pump apparatus 100 includes a cooling water circuit unit 80 that is driven during a cooling operation. The cooling water circuit unit 80 serves to cool refrigerant vapor in the condenser 20, and to cool the heat of absorption produced by the absorption of the refrigerant into the absorption liquid in the absorber 40. Specifically, the cooling water circuit unit 80 includes a circulation tube conduit 82 through which cooling water (coolant) 81 (refer to FIG. 2) flows; a pump 83 that circulates the cooling water 81; a heat exchanger 84 that is disposed in the condenser 20, and cools refrigerant vapor using heat exchanged between the refrigerant vapor and the cooling water 81; a heat exchanger 43 that is disposed in the absorber 40, and cools the absorption liquid using heat exchanged between the absorption liquid generating the heat of absorption, and the cooling water 81; and a cooling water cooling unit 85 that cools the cooling water 81 which can be re-circulated. In the cooling water cooling unit 85, the cooling water 81 flowing through a heat exchanger 85a is cooled by air (outside air) blown by a blower 85b. The cooling water 81 is an example of a "heat exchanging fluid" of this disclosure.

Here, in the first embodiment, the following is the configuration of the absorber 40 in which refrigerant vapor (low-temperature water vapor) is absorbed by the absorption liquid (LiBr aqueous solution).

Figure 2:
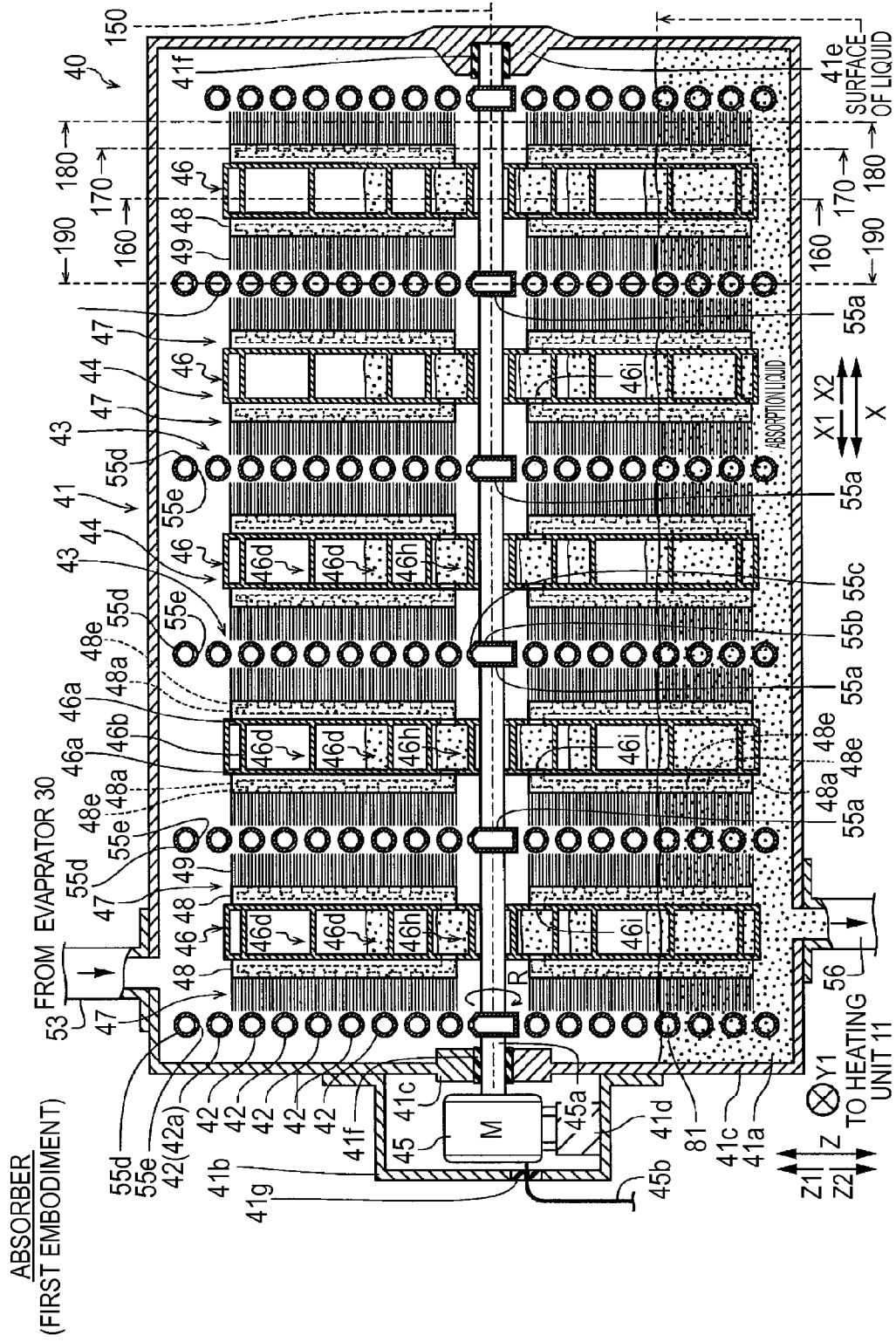
FIG. 2 is a side cross-sectional view illustrating the structure of an absorber of the absorption heat pump apparatus according to the first embodiment of this disclosure.
Figure 4:
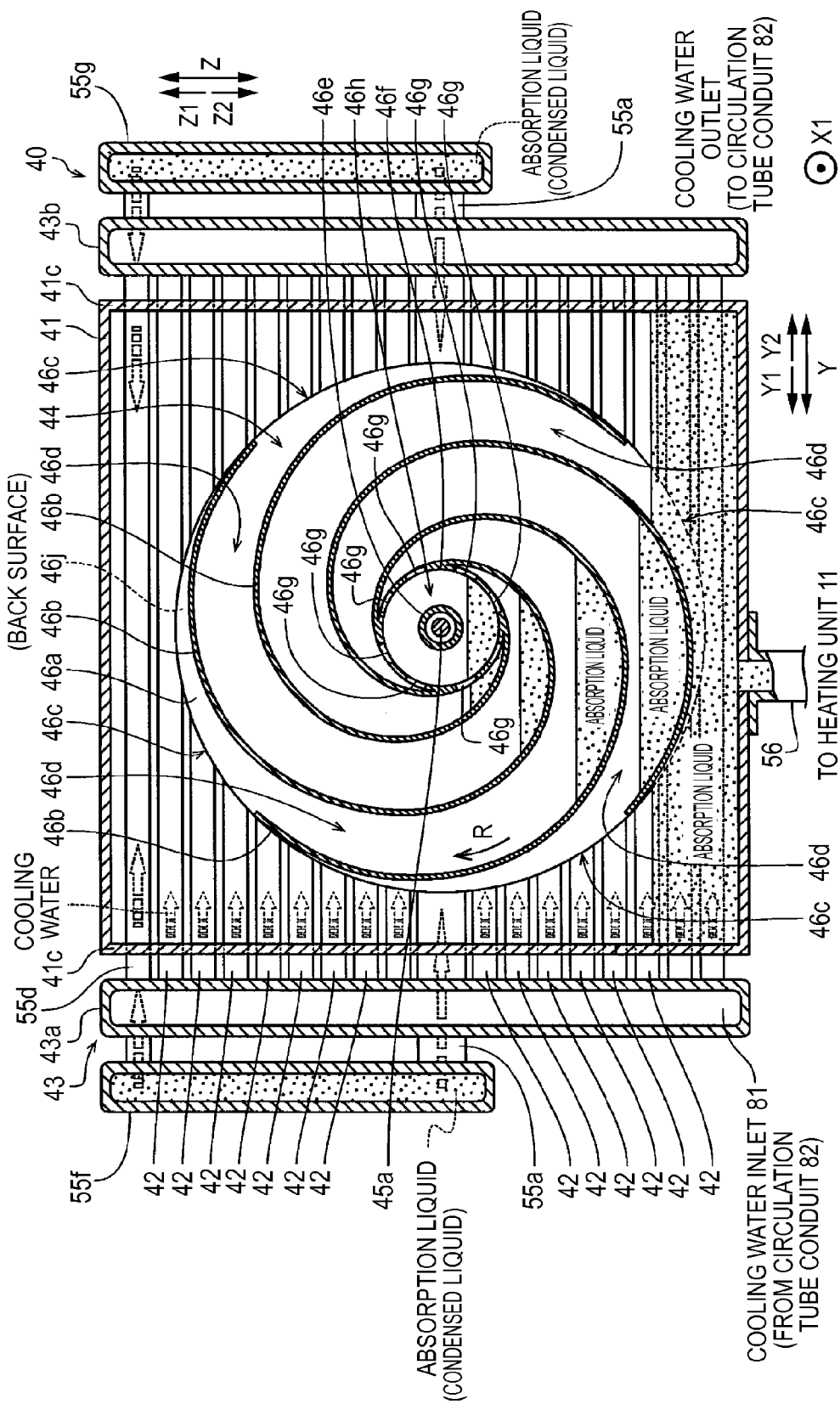
FIG. 4 is a cross-sectional view of the absorber taken along line 160-160 in FIG. 2.
Figure 7:
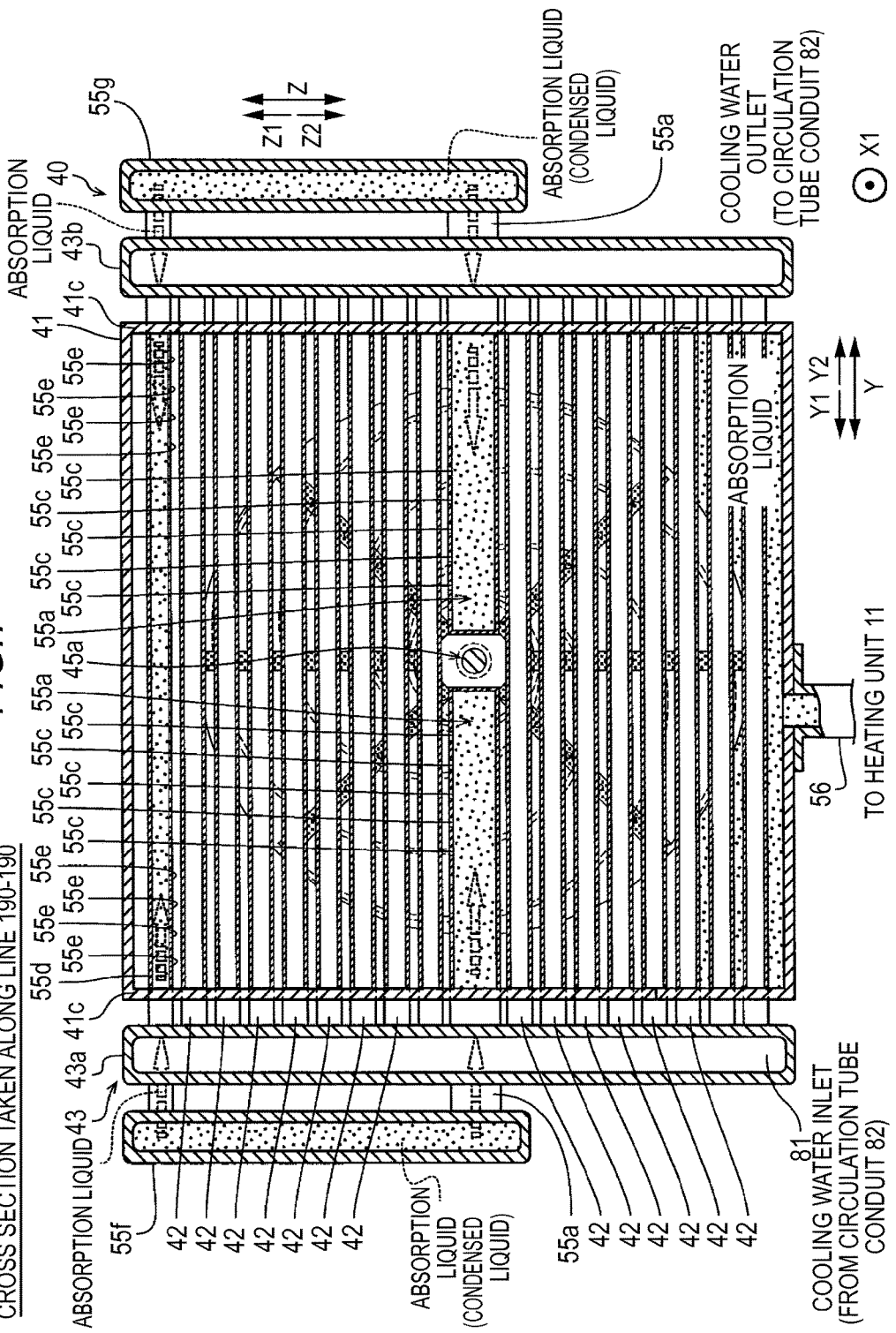
FIG. 7 is a cross-sectional view of the absorber taken along line 190-190 in FIG. 2.

Specifically, as illustrated in FIG. 2, the absorber 40 includes a container 41 and the heat exchanger 43, and the container 41 has a liquid storage portion 41a in which the absorption liquid (mixed solution of condensed liquid and diluted liquid) is stored, and the heat exchanger 43 includes a plurality of (a total of 96) heat transfer tubes 42, each of which is formed of an element tube (bare tube) having a tubular cross section (refer to FIG. 7). Here, a row of the heat transfer tubes are formed by vertically (in a Z direction) disposing 16 (8 at an upper stage and 8 at a lower stage) heat transfer tubes 42 which straightly extend in a horizontal direction (in a Y direction). 6 rows of the heat transfer tubes are disposed with an equal pitch held therebetween in an X direction. In this state, a tubular (circumferential-shaped) outer surface 42a of the heat transfer tube 42 is exposed in the container 41. As illustrated in FIG. 4, horizontal (Y direction) opposite end portions of the heat transfer tubes 42 pass horizontally through side wall portions 41c of the container 41, respectively, and then the opposite end portions are respectively connected to a collecting tube 43a (positioned in a direction of arrow Y1) and a collecting tube 43b (positioned in a direction of arrow Y2). The collecting tube 43a and the collecting tube 43b are connected to the circulation tube conduit 82 (refer to FIG. 1) on the outside, and the cooling water 81 flowing into the collecting tube 43a from the circulation tube conduit 82 is distributed to the heat transfer tubes 42. The cooling water 81 flows through the heat transfer tubes 42 in the direction of arrow Y2, collects in the collecting tube 43b, and returns back to the circulation tube conduit 82.

As illustrated in FIG. 2, the absorber 40 includes the container 41; rotating structural bodies 44 that rotate about a center line 150 (illustrated by an alternating long and short dash line) in the container 41; and a motor 45 that rotates the rotating structural bodies 44 via a rotating shaft 45a in a clockwise direction (in a direction of arrow R). The heat transfer tubes 42 of the heat exchanger 43 are not disposed in a portion of the heat exchanger 43, through which the rotating shaft 45a passes.

Here, in the first embodiment, during the operation of the absorption heat pump apparatus 100, the rotating structural bodies 44 are rotated through the driving of the motor 45 in the absorber 40. The rotating structural bodies 44 rotate in the direction of arrow R, and the absorption liquid (LiBr aqueous solution) in the liquid storage portion 41a is pumped upward, and finally, the absorption liquid is uniformly supplied to rows of the heat transfer tubes (the outer surfaces 42a of the plurality of heat transfer tubes 42) which are adjacent to the rotating structural bodies 44. At this time, the absorption liquid is supplied to a root portion 47a (refer to FIG. 3) of a brush member 47 (refer to FIG. 3) (to be described later) of the rotating structural body 44, and the outer surface 42a of the heat transfer tube 42 is coated with the absorption liquid through the brush member 47, in the form of a thin liquid film. Accordingly, the absorption liquid in the liquid storage portion 41a is repeatedly supplied to the outer surface 42a of the heat transfer tube 42 by the rotating structural body 44. Hereinafter, the configuration of the rotating structural body 44 will be described in more detail. The brush member 47 is an example of a "coating member" of this disclosure.

As illustrated in FIGS. 2 and 4, the rotating structural body 44 has pumping members 46 that are made of metal (stainless steel) and are coaxially fixed to the rotating shaft 45a, and brush members 47 (refer to FIG. 3) that are fixed to the pumping members 46 and rotate integrally with the pumping members 46, respectively. The pumping member 46 includes a pair of annular platelike members 46a, the rotation center region of each of which is cored out so as to allow the rotating shaft 45a to pass therethrough, and which has a circular outer circumference. In addition, a plurality of blade members 46b are interposed between a pair of the platelike members 46a, and spirally extend from a radial outer side of the pumping member 46 toward the center of rotation. Accordingly, an opening portion 46c and a solution movement path 46d are formed between a pair of the platelike members 46a of the pumping member 46. Here, the opening portion 46c is opened to the outside, and the solution movement path 46d spirally extends from the opening portion 46c as its starting point on the radial outer side of the platelike member 46a toward the center of rotation. The blade member 46b is an example of a "blade portion" of this disclosure. The opening portion 46c is an example of a "pumping portion" of this disclosure, and the solution movement path 46d is an example of a "first solution passage" of this disclosure.

The solution movement path 46d has the maximum cross-sectional flow path area of the opening portion 46c, and spirally extends toward the center of rotation while the cross-sectional flow path area decreases. A pair of the platelike members 46a is connected to each other at the center of rotation via connecting members 46e and 46f which are coaxially disposed. The connecting member 46e is disposed with a slight gap held from the rotating shaft 45a, and the connecting member 46f is disposed on an outer side of the connecting member 46e with a predetermined gap held from the connecting member 46e. The connecting member 46f is connected to an end portion of the blade member 46b opposite to the opening portion 46c. A plurality of (8 pieces) communication holes 46g are formed in the connecting member 46f, and the solution movement paths 46d are communicated with a ring-shaped collecting portion (spatial portion) 46h interposed between the connecting members 46e and 46f via the communication holes 46g. Four spiral blade members 46b connecting a pair of the platelike members 46a are provided while an equal gap (equiangular gap) about the center line 150 is held between the blade members 46b. Accordingly, 4 solution movement paths 46d having the same shape are formed in the pumping member 46, and each of the solution movement paths 46d is formed by a pair of the platelike members 46a and the adjacent blade members 46b spirally extending.

As illustrated in FIGS. 2 and 4, a discharge hole 46i is formed to pass through a center region of the platelike member 46a in a thickness direction (in the X direction). Eight discharge holes 46i are formed while an equiangular (approximately 45°) gap about the center of rotation is held between the discharge holes 46i. The brush member 47 extending in the radial direction is attached to an outer surface 46j of the platelike member 46a positioned opposite to (positioned in a direction of arrow X1 and in a direction of arrow X2) the blade members 46b. Eight brush members 47 are provided on the outer surface 46j while an equiangular (approximately 45°) gap about the center line 150 is interposed between the brush members 47. Accordingly, one rotating structural body 44 has the brush members 47 of a total of 16. The discharge hole 46i is an example of a "solution discharge hole" of this disclosure.

Figure 3:
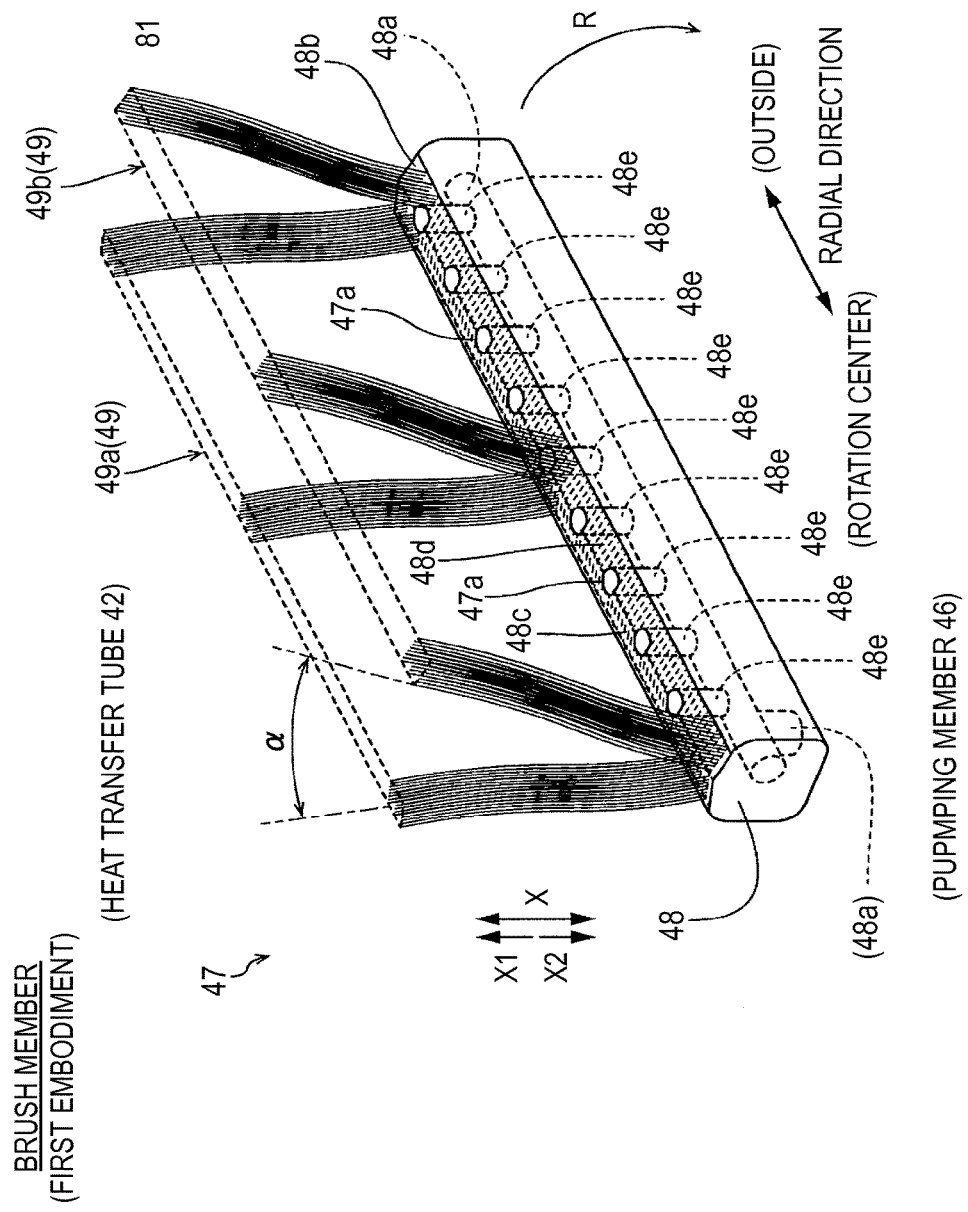
FIG. 3 is a perspective view illustrating the detailed structure of a brush member attached to a pumping member in the absorber of the absorption heat pump apparatus according to the first embodiment of this disclosure.

As illustrated in FIG. 3, the brush member 47 includes a brush fixing portion 48 and brush portions 49. Here, the brush fixing portion 48 made of stainless steel has a columnar exterior appearance and a hollow structure having a solution movement path 48a that is made by coring out the inner portion of the brush fixing portion 48 in a longitudinal direction (in the radial direction), and the brush portions 49 vertically (in the substantially X direction) extend from a side surface 48b along the longitudinal direction of the brush fixing portion 48. The side surface 48b is made to have a mountain shape in which a ridge portion is formed at the center thereof. The brush portions 49 formed of a bundle of resin fibers are implanted along a pair of inclined surfaces 48c and 48d that are inclined in opposite directions with the ridge portion (illustrated by a dotted line) interposed between the inclined surfaces 48c and 48d. Accordingly, a brush row 49a (the shape of the row is illustrated by a frame depicted by a dotted line) implanted on the inclined surface 48c and a brush row 49b (the shape of the row is illustrated by a frame depicted by a dotted line) implanted on the inclined surface 48d extend in a direction of separation from the side surface 48b, with a predetermined open angle α (approximately 30°) held between the brush rows 49a and 49b. The brush member 47 is an example of the "coating member" of this disclosure. The brush fixing portion 48 is an example of a "coating member fixing portion" of this disclosure, and the solution movement path 48a is an example of a "second solution passage" of this disclosure.

Figure 6:
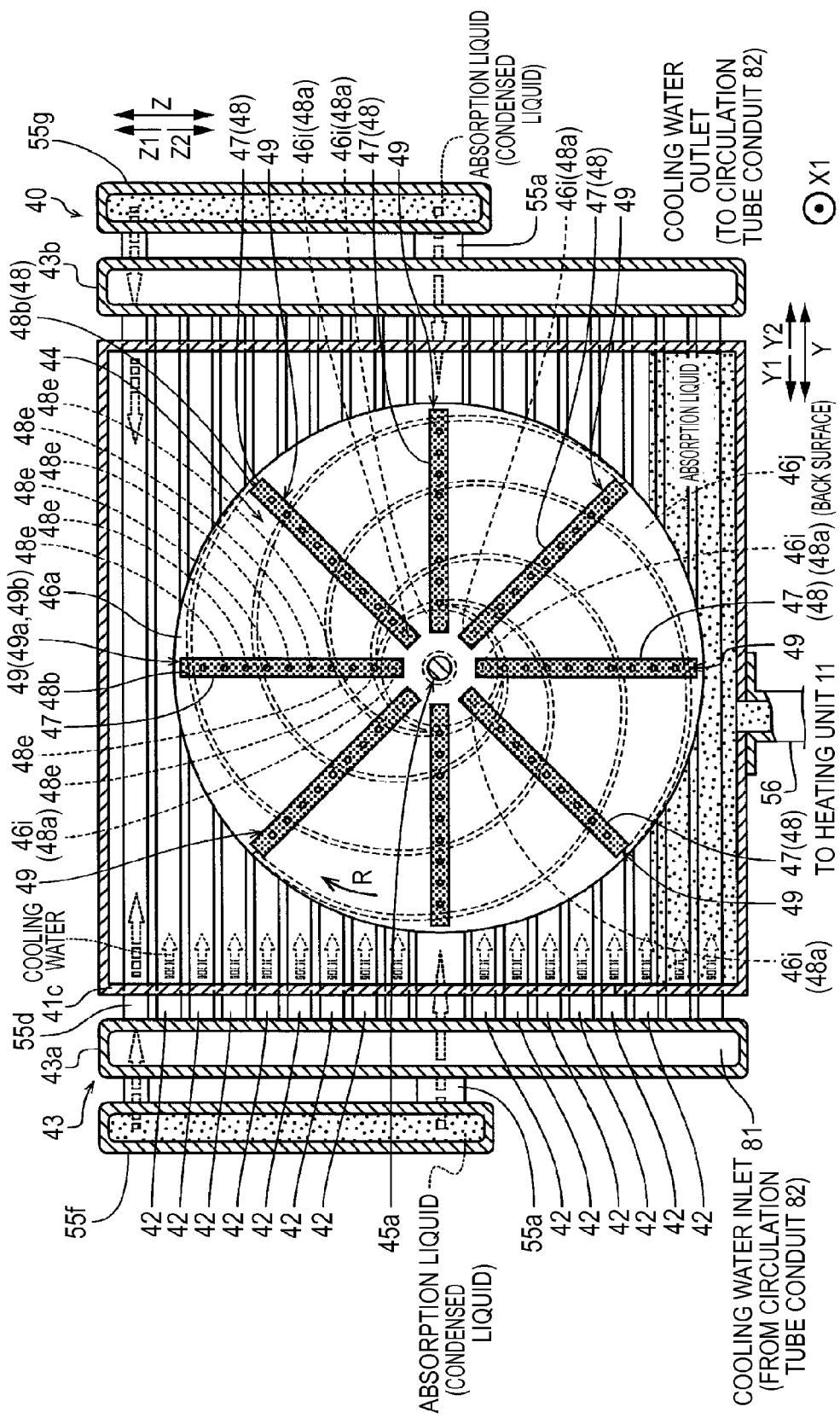
FIG. 6 is a cross-sectional view of the absorber taken along line 180-180 in FIG. 2.

As illustrated in FIGS. 3 and 6, the brush fixing portion 48 has a plurality of branch arm tubes 48e that form a part of the solution movement path 48a, extend in a direction orthogonal to the solution movement path 48a extending in the radial direction, and pass through the side surface 48b (ridge portion at the center). Nine branch arm tubes 48e are formed in the solution movement path 48a, and are opened in the side surface 48b at positions that do not overlap the implant positions of the brush portions 49. The branch arm tubes 48e have the same inner diameter, and are made to branch off from the solution movement path 48a, with an equal gap (in the rotational radial direction) between the branch arm tubes 48e. The length of the brush portion 49 (the brush row 49a and the brush row 49b) is set in order for a tip end portion of the brush portion 49 to reach the outer surface 42a of the heat transfer tube 42. The branch arm tube 48e is an example of a "solution supply hole" of this disclosure.

Figure 5:
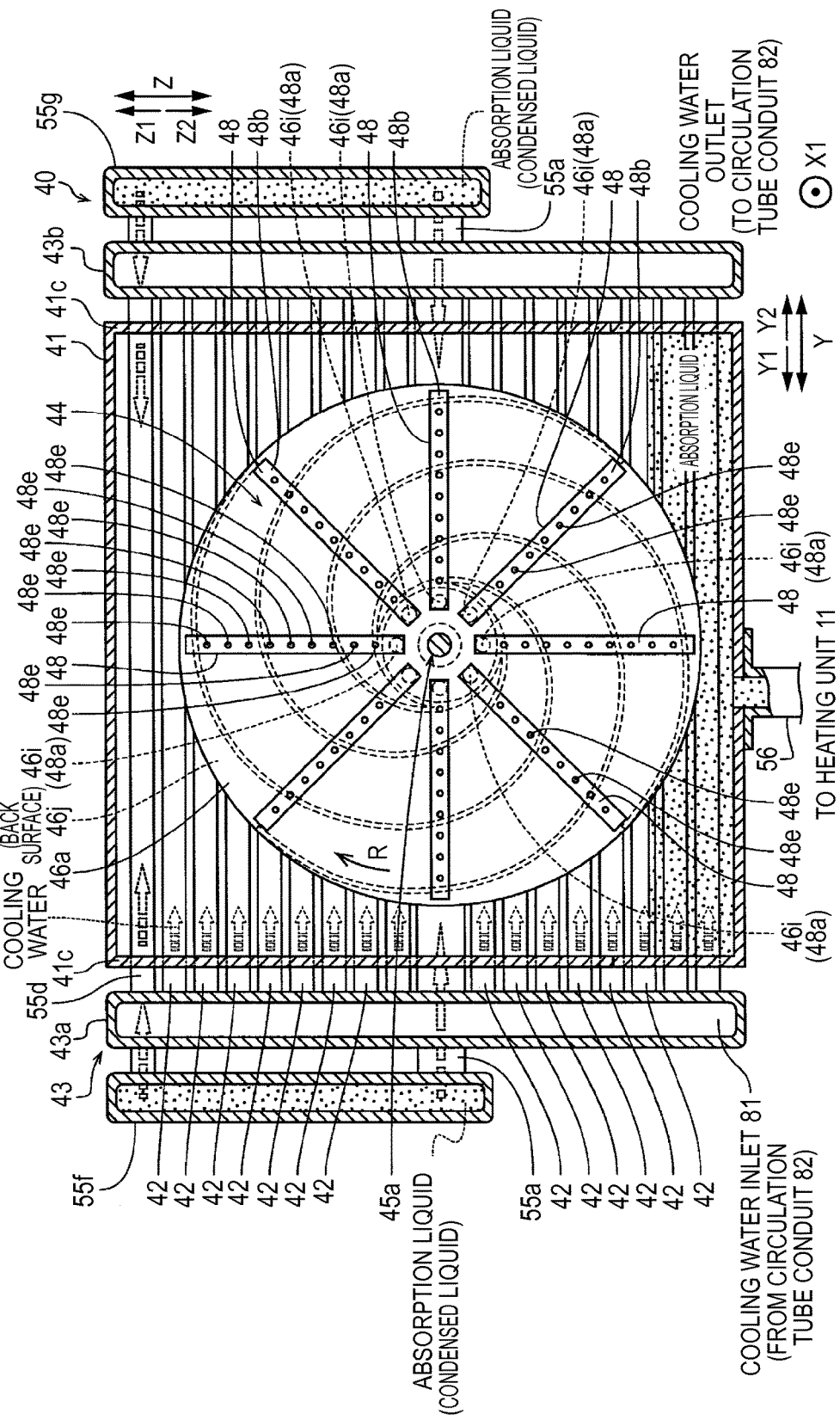
FIG. 5 is a cross-sectional view of the absorber taken along line 170-170 in FIG. 2.

As illustrated in FIG. 5, the brush fixing portion 48 is fixed to the outer surface 46j in such a manner that a portion of the solution movement path 48a positioned near the center of rotation is bent toward the platelike member 46a, and the solution movement path 48a has the same inner diameter as the discharge hole 46i and is communicated with the discharge hole 46i. Accordingly, as illustrated in FIG. 2, a flow path is formed in the rotating structural body 44 in such a manner that the absorption liquid can sequentially flow through the opening portion 46c, the solution movement path 46d (the communication hole 46g), the collecting portion 46h, the discharge hole 46i, and the solution movement path 48a (branch arm tube 48e). As described above, 8 brush members 47, each of which includes the brush fixing portion 48, are provided so as to correspond to the number (8 pieces) of formed discharge holes 46i, and the brush fixing portions 48 are provided so as to radially extend on the outer surface 46j of one of the platelike members 46a with a gap of approximately 45° held between the brush fixing portions 48.

Typically, the liquid storage portion 41a stores a predetermined depth of the absorption liquid (mixed solution of condensed liquid and diluted liquid). Accordingly, as illustrated in FIG. 4, a lower portion of the pumping member 46 and a lower portion of the brush member 47 in the rotating structural body 44 are disposed in the container 41 to be immersed in the liquid storage portion 41a that stores the absorption liquid.

Accordingly, in the first embodiment, the absorption liquid is pumped upward by the pumping member 46 of the rotating structural body 44, moves to the collecting portion 46h at the center of rotation via the opening portions 46c and the solution movement paths 46d (the communication holes 46g) due to the rotation of the pumping member 46 in the direction of arrow R, and then radially moves outward from the center of rotation via the discharge holes 46i and the solution movement paths 48a (the branch arm tubes 48e). While the absorption liquid is supplied to the root portion 47a of the brush member 47 from 9 branch arm tubes 48e of the solution movement path 48a, the outer surface 42a of the heat exchanger 43 is coated with the absorption liquid through the brush member 47 in the form of a thin liquid film.

In the first embodiment, one rotating structural body 44 is provided with 4 solution passages (4 paths) from the opening portions 46c to the collecting portion 46h via the solution movement paths 46d, and is provided with 16 solution movement paths 48a (8 paths×2) from the collecting portion 46h in the vicinity of the center of rotation to the outer surface 46j via the discharge holes 46i. Accordingly, when the rotating structural body 44 is rotated using the motor 45, the movement of the solution (absorption liquid) is repeated without a pause as follows: the absorption liquid is pumped upward from the liquid storage portion 41a via the opening portions 46c which are continuously adjacent to each other, collects in the collecting portion 46h, and radially spreads from 8 solution movement paths 48a rotating integrally with the pumping member 46, via the discharge holes 46i. In the brush portion 49 (the brush row 49a and the brush row 49b) of the brush member 47, while the rotating structural body 44 rotates, the absorption liquid supplied via the brush fixing portion 48 (solution movement path 48a) oozes out of the root portion 47a, and the tip end portion of the brush portion 49 rotates along the outer surfaces 42a of the heat exchanger 43 while containing a large quantity of the absorption liquid. Since the plurality of rotating brush members 47 are disposed with a gap of approximately 45° held therebetween, the rotating structural body 44 rotates in a state where the balance of weight about the center line 150 is tuned to some extent.

As illustrated in FIGS. 2 and 3, one rotating structural body 44 includes a pair of the platelike members 46a; the pumping member 46 that includes 4 blade members 46b interposed between the platelike members 46a; and the brush members 47 (a total of 16), each of which includes the brush fixing portion 48 fixed to each of the outer surface 46j of the pair of the platelike members 46a. The rotating structural bodies 44 of a total of 5 are disposed on the rotating shaft 45a with an equal pitch (equivalent to a separation gap between rows of the heat transfer tubes (the heat transfer tubes 42) in the X direction) held therebetween in the X direction. The five rotating structural bodies 44 rotate integrally with the rotating shaft 45a about the center line 150. For descriptive purposes, FIG. 2 illustrates two upper and lower brush members 47 which are positioned in the Z direction among 8 brush members 47 as an illustration in which the rotating structural body 44 is rotated at a certain moment. In reality, as illustrated in FIG. 3, the brush members 47 of a total of 8 are provided about the rotating shaft 45a, and include the brush members 47 positioned obliquely in a 45° direction, and the brush members 47 positioned in the horizontal direction.

In the first embodiment, the outer surface 42a is thinly coated with the absorption liquid (LiBr condensed liquid) due to the rotation of the brush member 47 (refer to FIG. 6), and thereby a thin liquid film (liquid film of the absorption liquid) is widely formed on the outer surface 42a while the wettability of the absorption liquid with respect to the outer surface 42a of the heat transfer tube 42 is well held. Specifically, when the brush portion 49 (the brush row 49a and the brush row 49b (refer to FIG. 3)) rotates along the outer surfaces 42a of the heat transfer tubes 42, the brush portion 49 newly coats the outer surfaces 42a, from which the heat exchanged absorption liquid is removed, with the absorption liquid (LiBr aqueous solution (condensed liquid) that absorbs a relatively small amount of the refrigerant) supplied to the brush portion 49 while removing the absorption liquid (LiBr aqueous solution that is diluted by absorbing a relatively large amount of the refrigerant), which is subjected to heat exchange with the cooling water 81 and still remains on the outer surfaces 42a, from the outer surfaces 42a. The heat of absorption produced by the absorption of the refrigerant (low-temperature water vapor) into the coating absorption liquid is taken away to the cooling water 81 via the outer surface 42a of the heat transfer tube 42. Accordingly, the temperature of the coating absorption liquid is held at a relatively low temperature, thereby further expediting the absorption of the refrigerant (water) into the coating absorption liquid. In a state where the absorption liquid is diluted due to the absorption of the refrigerant into the absorption liquid, and the concentration of the absorption liquid becomes close to that of LiBr diluted liquid, the absorption liquid is removed from the outer surface 42a by the brush portion 49, and falls into the liquid storage portion 41a. This phenomenon is continuously repeated in the absorber 40, and the absorption of the refrigerant into the absorption liquid is done, and the cooling of the absorption liquid is done.

The rotating speed of the brush member 47 (rotating speed of the rotating shaft 45a) is adjusted according to the capacity of the absorption heat pump apparatus 100. That is, the rotating speed of the rotating shaft 45a (refer to FIG. 2) is preferably adjusted to an optimum speed in such a manner that the cooling water 81 more efficiently cools a liquid film of the coating absorption liquid on the outer surface 42a of the heat transfer tube 42, and the absorption liquid appropriately absorbs refrigerant vapor. At this time, the rotating speed of the rotating shaft 45a may be adjusted by providing a speed reduction gear unit (not illustrated) or the like between the motor 45 and the rotating shaft 45a, or the rotating shaft 45a may be directly rotated using the motor 45 that can rotate at a low speed. When a change in air conditioning load is small, the rotating speed of the motor 45 is preferably controlled at a constant speed, and when the air conditioning load changes considerably, the rotating speed of the motor 45 is controlled depending on the air conditioning load.

As illustrated in FIG. 2, a housing 41b made of metal is attached to an outer surface of the side wall portion 41c of the container 41, which is positioned in the direction of arrow X1. The motor 45 is fixed to an inner bottom surface of the housing 41b using an attaching member 41d. The internal pressure of the housing 41b is held substantially the same as that (vacuum state of an absolute pressure of 1 kPa or less) of the container 41, and the housing 41b is sealed with respect to the outside. The rotating shaft 45a of the motor 45 passes through the side wall portion 41c of the container 41, extends in the container 41 in the direction of arrow X2 (in the horizontal direction), and is rotatably supported by a wall portion 41e (positioned in the direction of arrow X2) of the container 41 via the center special portion in which the heat transfer tubes 42 are not disposed. With sealing members 41f interposed between the rotating shaft 45a and the side wall portion 41c, and between the rotating shaft 45a and the wall portion 41e, the sealing members 41f are respectively disposed in a portion of the side wall portion 41c through which the rotating shaft 45a passes, and a portion of the wall portion 41e which rotatably supports the rotating shaft 45a. The sealing member 41f in the direction of arrow X1 serves to prevent the absorption liquid in the liquid storage portion 41a from climbing over the side wall portion 41c and leaking into the housing 41b. A sealing member 41g is provided in a portion of the housing 41b, through which a wiring 45b leading out from the motor 45 passes.

The refrigerant delivery tube conduit 54 communicated with the evaporator 30 (refer to FIG. 1) is connected to an inner ceiling portion (positioned in a direction of arrow Z2) of the container 41, and refrigerant vapor evaporating in the evaporator 30 is supplied (suctioned) into the container 41. The absorption liquid delivery tube conduit 55 is connected to the container 41 in such a manner that the absorption liquid (condensed liquid) can be supplied from the liquid-vapor separation unit 12 to the absorber 40 therethrough, and the absorption liquid delivery tube conduit 56 is connected to the container 41 in such a manner that the absorption liquid absorbing the refrigerant in the absorber 40 can be supplied to the heating unit 11 therethrough.

Here, in the first embodiment, the container 41 includes a solution supply portion 55a that is provided in a rotation path of the brush member 47 of the rotating structural body 44, and that can guide the absorption liquid (condensed liquid) into the container 41 from the outside of the container 41 via the absorption liquid delivery tube conduit 55, and can supply the absorption liquid to the brush member 47. As illustrated in FIG. 7, the solution supply portion 55a is provided in the rotation path of the brush member 47 so as to extend along a direction that passes through the center of rotation of the pumping member 46, and along the radial direction of the pumping member 46. At this time, the solution supply portion 55a is provided at a height in the vicinity of the center of rotation of the pumping member 46 so as to extend along the horizontal direction and the radial direction of the pumping member 46, and the solution supply portion 55a can supply the absorption liquid (condensed liquid) to the brush member 47 that extends in the radial direction of the pumping member 46.

That is, as illustrated in FIGS. 2 and 7, the solution supply portion 55a has a slit 55c that is made by cutting a horizontal (Y direction) slender portion away from the vicinity of the ceiling (region in a direction of arrow Z1) of a tube wall portion 55b. The solution supply portion 55a has a tapered cross-sectional shape, and has inclined surfaces bent at the middle of the course from a bottom portion (portion positioned in the direction of arrow Z2) of the tube wall portion 55b to the ceiling wall portion (portion positioned in the direction of arrow Z1) provided with the slit 55c. Accordingly, the absorption liquid (condensed liquid) supplied from the absorption liquid delivery tube conduit 55 to the solution supply portion 55a is directly supplied to the brush portion 49 (the brush row 49a and the brush row 49b) of the brush member 47 disposed obliquely below the solution supply portion 55a, while spouting from the slit 55c which extends in the Y direction, and dripping obliquely downward from the inclined surfaces (outer surface) of the tapered tube wall portion 55b.

As illustrated in FIGS. 2 and 7, a solution supply portion 55d is separately provided above the uppermost heat transfer tube 42. The solution supply portion 55d has a plurality of sprinkling holes 55e in a bottom portion (portion positioned in the direction of arrow Z2) thereof. Accordingly, the absorption liquid (condensed liquid) supplied to the solution supply portion 55d from the absorption liquid delivery tube conduit 55 drips downward (is sprinkled) from the plurality of sprinkling holes 55e, and is directly supplied to a row of the heat transfer tubes (8 upper heat transfer tubes 42 and 8 lower heat transfer tubes 42). Horizontal (Y direction) opposite end portions of each of the solution supply portions 55a and 55d pass horizontally through the side wall portions 41c of the container 41, respectively, and are connected to a collecting tube 55f (positioned in the direction of arrow Y1) and a collecting tube 55g (positioned in the direction of arrow Y2), respectively. The collecting tubes 55f and 55g are connected to the absorption liquid delivery tube conduit 55.

As such, during a cooling operation, refrigerant vapor (low-temperature water vapor) evaporates in the evaporator 30, is suctioned into the absorber 40 via the refrigerant vapor delivery tube conduit 53, and is mixed with the absorption liquid (LiBr aqueous solution) in the absorber 40, and thereby the absorption liquid in a diluted state is made.

As illustrated in FIG. 1, the evaporator 30 includes the heat exchange unit 32 installed in a container 31, and an injector 33 attached to the vicinity of an inner ceiling portion of the container 31. A pump 35 is provided in a refrigerant delivery tube conduit 34 on the outside of the evaporator 30, and the refrigerant delivery tube conduit 34 connects a refrigerant storage portion 31a and the injector 33. Accordingly, the refrigerant (water) in the refrigerant storage portion 31a is pumped upward by the pump 35, and the injector 33 injects the refrigerant in the form of mist toward a heat exchange unit 32 thereunder. Accordingly, during a cooling operation, when suctioned indoor air, which is blown by a blower 36 and is not subjected to heat exchange, passes through the heat exchange unit 32, the suctioned indoor air is cooled by using the heat of vaporization that is produced when the refrigerant (water) sprayed from above evaporates, and is turned into refrigerant vapor (low-temperature water vapor). The cooled air (cool wind) is blown into a vehicle cabin.

The absorption heat pump apparatus 100 includes a heat exchanger (plate type heat exchanger) 59 for heat exchange between the absorption liquid flowing through the absorption liquid delivery tube conduit 55 and the absorption liquid flowing through the absorption liquid delivery tube conduit 56. The heat exchanger 59 is a so-called "liquid-liquid heat exchanger". During a cooling operation, the heat exchanger 59 serves to decrease the temperature of the absorption liquid that flows from the liquid-vapor separation unit 12 toward the absorber 40, and to increase the temperature of the absorption liquid that flows from the absorber 40 toward the circulation passage unit 51, by taking heat away from the absorption liquid (condensed liquid) that flows from the liquid-vapor separation unit 12 toward the absorber 40, and by giving the heat to the absorption liquid (diluted liquid) that flows from the absorber 40 toward the circulation passage unit 51.

The heating unit 11 serves to heat the absorption liquid produced by the absorption of the refrigerant (water) into LiBr condensed liquid. That is, in the heating unit 11, heat exchange is done between high-temperature (approximately 300° C. to approximately 400° C.) exhaust gas that flows through an exhaust gas pipe 91 from the engine 90 of a passenger vehicle (not illustrated), and the absorption liquid that flows through the circulation passage unit 51. The exhaust gas pipe 91 includes a heat supply pipe conduit 91a that passes through the heating unit 11, and a bypass pipe conduit 91b that does not pass through the heating unit 11. A valve 92 is provided in the heat supply pipe conduit 91a between the engine 90 and the heating unit 11. When the valve 92 is opened during a cooling operation and a heating operation, a part of exhaust gas discharged from the engine 90 flows through the heating unit 11 through the heat supply pipe conduit 91a. When the valve 92 is closed, exhaust gas is discharged through the bypass pipe conduit 91b. The absorption heat pump apparatus 100 is configured as described above.

In the first embodiment, it is possible to obtain the following effects.

That is, in the first embodiment, as described above, the absorber 40 includes the pumping member 46 that pumps the absorption liquid (LiBr aqueous solution) in the liquid storage portion 41a upward using the rotation of the rotating structural body 44, and includes the brush members 47, each of which rotates integrally with the pumping member 46, is provided so as to radially extend outward from the center of rotation of the pumping member 46, and coats the outer surfaces 42a of the heat exchanger 43 with the absorption liquid pumped upward by the pumping member 46. While the absorption liquid pumped upward by the pumping member 46 of the rotating structural body 44 moves to the center of rotation due to the rotation of the pumping member 46 in the direction of arrow R, and then radially moves outward from the center of rotation, the outer surfaces 42a of the heat exchanger 43 are coated with the absorption liquid through the brush members 47. Accordingly, after the absorption liquid (LiBr aqueous solution) subjected to heat exchange on the outer surfaces 42a of the heat exchanger 43 falls, and is stored in the liquid storage portion 41a, the pumping member 46 can pump the stored absorption liquid upward again, and the brush member 47 can coat the outer surfaces 42a of the heat exchanger 43 with the absorption liquid, while the wettability of the absorption liquid with respect to the outer surface 42a is held. That is, since the absorption liquid is not allowed to flow to the outside while being not sufficiently subjected to heat exchange, the absorption liquid staying in the liquid storage portion 41a can be repeatedly supplied to the heat exchanger 43, and heat exchange can be done between the absorption liquid and the cooling water 81, it is possible to improve the cooling performance of the absorber 40 for cooling the absorption liquid. In other words, it is possible to obtain the amount of heat exchange equivalent to that in the related art even though using the heat exchanger 43 having a smaller size than in the related art. In this case, since the rotating pumping member 46 is provided in the container 41, it is not necessary to install a circulation pump (solution pump) for circulating the absorption liquid and a solution circulation circuit in the absorption heat pump apparatus 100, or it is not necessary to provide a countermeasure for preventing a cavity phenomenon originating from the use of the circulation pump. Accordingly, it is possible to reduce the size of the absorption heat pump apparatus 100. As a result, it is possible to reduce the size of the absorption heat pump apparatus 100 while maintaining the performance of the heat exchanger (the cooling performance of absorption liquid).

In the first embodiment, while the absorption liquid pumped upward by the pumping member 46 of the rotating structural body 44 moves to the center of rotation due to the rotation of the pumping member 46, and thereafter, radially moves outward from the center of rotation, the brush member 47 coats the outer surfaces 42a of the heat exchanger 43 with the absorption liquid. That is, the absorption liquid is collected at the center of rotation by effective use of the rotation of the pumping member 46, and thereafter radially spreads (moves) outward from the center of rotation, and thereby it is possible to uniformly spread through the outer surfaces 42a of the heat exchanger 43 through the brush member 47. Accordingly, heat exchange between the absorption liquid and the cooling water 81 can be done through the entirety of the outer surfaces 42a of the heat exchanger 43, which corresponds to the rotation path (coating region) of the brush member 47 (the brush portion 49), and thereby it is possible to improve the cooling performance of the absorber 40 for cooling the absorption liquid.

In the first embodiment, since the rotating structural body 44 includes the brush member 47 that coats the outer surfaces 42a of the heat exchanger 43 with the absorption liquid pumped upward by the pumping member 46, even when the absorption heat pump apparatus 100 is mounted not in stationary equipment such as in facilities but in a moving body such as a vehicle, the outer surfaces 42a of the heat exchanger 43 can be normally coated with the absorption liquid pumped upward by the rotating pumping member 46, and thereby the operation of the absorption heat pump apparatus 100 can be performed while being not considerably affected by an inclined state or an excitation state of the absorber 40. The outer surface 42a of the heat exchanger 43 (heat transfer tube 42) is coated with the adsorption liquid through the brush member 47 which radially extends outward from the center of rotation of the pumping member 46, while good wettability of the absorption liquid is held, and thereby it is possible to easily form thin liquid films over a wide range, and it is not necessary to add a surfactant or the like to the absorption liquid (LiBr aqueous solution), and to prevent a decrease in the surface tension of the absorption liquid. Accordingly, in the absorption heat pump apparatus 100, it is possible to delete maintenance work for adding a surfactant to the absorption liquid, and thereby it is possible to increase maintenance intervals to that extent.

In the first embodiment, the pumping member 46 of the rotating structural body 44 includes the opening portions 46c that are provided on the radial outer side, and the solution movement paths 46d, through which the absorption liquid pumped upward through the opening portions 46c radially moves outward from the center of rotation due to the rotation of the pumping member 46. In addition, the brush member 47 includes the solution movement path 48a (brush fixing portion 48) which is provided on the outer surface 46j of the pumping member 46, and through which the absorption liquid (which moves to the center of rotation through the solution movement paths 46d) radially moves outward from the center of rotation. Accordingly, it is possible to more easily pump the absorption liquid in the liquid storage portion 41a upward through the opening portions 46c that are provided on the radial outer side of the rotating pumping member 46, and it is possible to easily move the absorption liquid (which is pumped upward due to the rotation of the pumping member 46) from the radial outer side to the center of rotation through the solution movement paths 46d. Since it is possible to easily move the absorption liquid (which moves to the center of rotation through the solution movement paths 46d and the solution movement path 48a that is provided on the outer surface 46j of the pumping member 46) outward in the radial direction by virtue of a centrifugal force originating from the rotation of the rotating structural body 44, it is possible to easily coat the entirety of the outer surfaces 42*a* of the heat exchanger 43 with a thin liquid film through the brush member 47, while radially moving the absorption liquid outward from the center of rotation.

In the first embodiment, in the rotating structural body 44, the pumping member 46 includes a pair of the platelike members 46*a*, and the blade members 46*b* that are interposed between the pair of the platelike members 46*a*, and that spirally extend from the radial outer side of the pumping member 46 to the center of rotation. The opening portions 46*c* and the solution movement paths 46*d* are formed by the pair of the platelike members 46*a* and the spirally extending blade members 46*b*. Accordingly, the portion of the pumping member 46 formed by a pair of the platelike members 46*a* and the spirally extending blade members 46*b* can easily form a structural body (the opening portions 46*c* and the solution movement paths 46*d*) that pumps the absorption liquid in the liquid storage portion 41*a* upward, and moves the absorption liquid to the center of rotation of the pumping member 46. In particular, since the solution movement paths 46*d* are spirally formed, it is possible to easily move the absorption liquid pumped upward (trapped) by the opening portions 46*c* to the center of rotation of the pumping member 46 by effective use of the rotation motion of the pumping member 46.

In the first embodiment, a plurality of pairs (4 pairs) of the opening portions 46*c* and the solution movement paths 46*d* are formed by providing the plurality (4 pieces) of the spirally extending blade members 46*b* with a gap held therebetween, and by providing the spatial portions made by a pair of the platelike members 46*a* and the adjacent blade members 46*b* spirally extending. Accordingly, one spiral solution movement path 46*d* is formed of the spatial portion made by a pair of the platelike members 46*a* and the adjacent two blade members 46*b* spirally extending, and the spiral solution movement path 46*d* guides the absorption liquid to the center of rotation of the pumping member 46. Since the plurality of pairs (4 pairs) of the opening portions 46*c* and the spiral solution movement paths 46*d* are provided about the rotating shaft of the pumping member 46, it is possible to continuously pump the absorption liquid of the liquid storage portion 41*a* upward through each of 4 pairs of the opening portions 46*c* and the solution movement paths 46*d* during the rotation of the pumping member 46. Accordingly, since it is possible to continuously perform an operation of pumping the absorption liquid upward, and an operation of supplying the absorption liquid to the outer surface 42*a* of the heat exchanger 43 in the container 41, it is possible to improve the performance of the heat exchanger to that extent. Different from the configuration in which one spiral solution movement path 46*d* is provided, since during the rotation of the pumping member 46, 4 solution movement paths 46*d* rotate sequentially while being separated by a predetermined gap of a rotation angle (in this case, disposed in a spiral shape) from each other, it is possible to prevent the entire weight of the pumping member 46 from being unbalanced, and as a result, it is possible to prevent the unbalance of the weight of the rotating structural body 44 from causing vibration or the like in the container 41. A load on the motor 45 which rotates the pumping member 46 can be reduced to the extent that the balance of weight is held.

In the first embodiment, the pumping member 46 of the rotating structural body 44 includes the discharge holes 46*i* that are provided near the center of rotation of the pumping member 46, which discharge the solution (which is pumped upward and moves to the center of rotation) to the solution movement path 48*a*. Accordingly, it is possible to easily move the absorption liquid pumped upward via the opening portions 46*c* from the solution movement paths 46*d* to the solution movement path 48*a* through the discharge holes 46*i*. At this time, it is possible to release (discharge) not only the absorption liquid but also vapor components (refrigerant vapor) (which is taken in during a pumping-up operation) in the container 41 to the solution movement path 48*a* through the discharge holes 46*i*. Accordingly, even when vapor components are likely to be taken in due to a high rotation speed of the pumping member 46 (rotation speed of the motor 45), it is possible to appropriately ensure the amount of pumped absorption liquid.

In the first embodiment, the brush fixing portion 48 for fixing the brush member 47 is further provided on the outer surface 46*j* of the pumping member 46 so as to radially extend outward from the center of rotation of the pumping member 46. The solution movement path 48*a* is formed in the brush fixing portion 48. Accordingly, it is possible to provide the solution movement path 48*a* (for moving the absorption liquid to the radial outer side and supplying the absorption liquid to the root portion 47*a* of the brush member 47) on the outer surface 46*j* of the pumping member 46 by effective use of the brush fixing portion 48 for fixing the brush member 47. Since the brush fixing portion 48 is also used as the solution movement path 48*a*, it is possible to prevent an increase in the number of components of a moving portion in the container 41, compared to when the brush fixing portion 48 and the solution movement path 48*a* are separately provided.

In the first embodiment, the solution movement path 48*a* is provided with the plurality of branch arm tubes 48*e* for supplying the absorption liquid to the brush member 47 along the radial direction. Accordingly, when the absorption liquid radially moves outward from the center of rotation through the solution movement path 48*a* due to a centrifugal force, the absorption liquid can be supplied to the root portion 47*a* of the brush member 47 while being discharged through each of the plurality of branch arm tubes 48*e*. Accordingly, it is possible to easily supply the absorption liquid (which is pumped upward by the pumping member 46) to the entire radial region of the brush member 47 (the brush portion 49).

In the first embodiment, the pumping member 46 of the rotating structural body 44 is provided with the plurality (8 pieces) of brush fixing portions 48 that radially extend with a gap of angle of approximately 45° held therebetween. Accordingly, since the plurality (8 pieces) of brush fixing portions 48 (the solution movement paths 48*a*) radially extending with a gap of angle of approximately 45° held therebetween sequentially rotate in the direction of arrow R, it is possible to supply a large amount of the absorption liquid to the brush members 47 (the brush portions 49) and to coat the outer surfaces 42*a* of the heat exchanger 43 compared to when one brush fixing portion 48 (one solution movement path 48*a*) is provided. Since 8 brush fixing portions 48 radially extend with a gap of angle of approximately 45° held therebetween, it is possible to prevent the entire weight of the rotating structural body 44 from being unbalanced during the rotation of the pumping member 46, and as a result, it is possible to prevent the unbalance of the weight of the rotating structural body 44 from causing vibration or the like in the container 41.

In the first embodiment, the rotating structural body 44 is further provided with the solution supply portion 55*a* that is provided in the rotation path of the brush member 47, guides the absorption liquid (condensed liquid) into the container 41 from the outside of the container 41, and can supply the absorption liquid to the brush member 47. Accordingly, since not only the absorption liquid in the liquid storage portion 41a can be pumped upward and supplied to the brush member 47 by the pumping member 46, but also the absorption liquid (condensed liquid) can be guided from the outside of the container 41 and be directly supplied to the brush member 47 (the brush portion 49) through the solution supply portion 55a, the recoating absorption liquid and the absorption liquid newly supplied from the outside are mixed in the container 41, and thereby the concentration of the absorption liquid can be held in an appropriate range. Accordingly, in a case where the container 41 is used as the absorber 40, since the absorber 40 can be brought into operation with the concentration of the absorption liquid held in an appropriate range, it is possible to improve the performance of the absorber 40. Accordingly, it is possible to easily reduce the size of the absorber 40. Even in a case where the absorption heat pump apparatus 100 is mounted in a moving body such as a vehicle, since the absorption liquid can be directly supplied to the rotating brush member 47 (the brush portion 49) through the solution supply portion 55a, the performance of the absorber 40 can be maintained while being not considerably affected by an inclined state or an excitation state of the absorption heat pump apparatus 100.

In the first embodiment, the solution supply portion 55a is provided in the rotation path of the brush member 47 so as to extend along the radial direction of the pumping member 46. Accordingly, it is possible to reliably supply the absorption liquid (condensed liquid) directly to the brush member 47 (the brush portion 49) (which rotates integrally with the pumping member 46 and radially extends to the outside) through the solution supply portion 55a that extends along the extension direction of the brush member 47.

In the first embodiment, the lower portion of the pumping member 46 is immersed in the liquid storage portion 41a. Accordingly, in a case where the pumping member 46 is applied to the absorber 40 in the absorption heat pump apparatus 100, since the lower portion of the pumping member 46 is normally immersed in the absorption liquid (LiBr aqueous solution) of the liquid storage portion 41a, the lower portion of the pumping member 46 is more cooled than the portions (portions other than the lower portion) of the pumping member 46 not immersed in the liquid storage portion 41a. Accordingly, it is possible to cool the absorption liquid while the absorption liquid is pumped upward and moves to the center of rotation due to the rotation of the cooled portion of the pumping member 46. Accordingly, it is possible to further improve the cooling performance (radiation performance) of the absorption liquid in the absorber 40.

In the first embodiment, the heat exchanger 43 includes the plurality (96 pieces) of heat transfer tubes 42 that extend along the horizontal direction with the predetermined gap vertically held therebetween. Accordingly, the use of the plurality (96 pieces) of heat transfer tubes 42 can facilitate the configuration of the heat exchanger 43. That is, in a state where the plurality of cylindrical heat transfer tubes 42 line up, and a wider heat transfer area (outer surface) of the heat exchanger 43 is ensured, it is possible to efficiently coat the outer surfaces 42a with the absorption liquid using the brush member 47. Since the plurality of cylindrical (tubular) heat transfer tubes 42 line up in a heat exchange element (the heat exchanger 43) through which the cooling water 81 flows, it is possible to decrease the wall thickness of each of the heat transfer tubes 42 to the extent that the strength of the heat exchanger 43 (heat transfer tube) improves. Accordingly, since the thermal resistance of a heat transfer wall for separating the absorption liquid and the cooling water 81 decreases to the extent that the wall thickness of the heat transfer tube 42 decreases, it is possible to improve the performance of the heat exchanger for cooling the absorption liquid.

Modification Example of First Embodiment

Subsequently, a modification example of the first embodiment will be described with reference to FIGS. 2, 3, and 8. According to the modification example of the first embodiment, in the configuration of a brush fixing portion 148 in an absorber 140, 9 branch arm tubes 148e in the solution movement path 48a are disposed in the radial direction with different gaps held therebetween. In the illustration of the drawings, the same reference signs will be assigned to the same configurations as the first embodiment. The brush fixing portion 148 is an example of the "coating member fixing portion" of this disclosure, and the branch arm tube 148e is an example of the "solution supply hole" of this disclosure.

Figure 8:
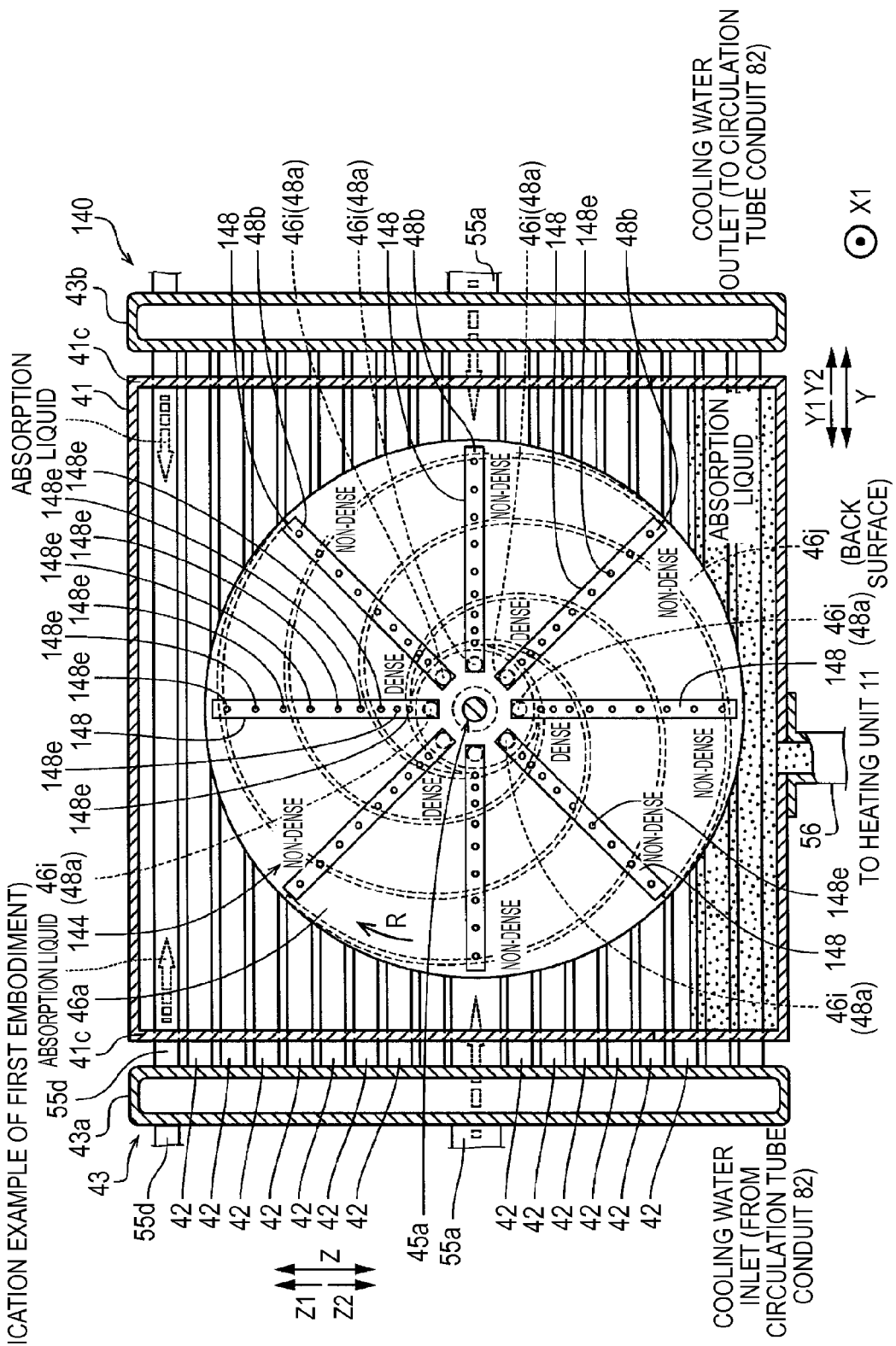
FIG. 8 is a cross-sectional view illustrating the structure of an absorber of an absorption heat pump apparatus according to a modification example of the first embodiment of this disclosure.

That is, as illustrated in FIG. 8, a rotating structural body 144 has the pumping member 46 and a brush member 147. The brush member 147 includes the brush fixing portion 148 having a hollow structure of the solution movement path 48a (refer to FIG. 3), and the brush portion 49 (refer to FIG. 3). The brush member 147 is an example of the "coating member" of this disclosure.

Here, in the modification example of the first embodiment, the brush fixing portion 148 has 9 branch arm tubes 148e that extend in a direction orthogonal to the solution movement path 48a extending in the radial direction. The branch arm tubes 148e have the same inner diameter, and the gap between the adjacent branch arm tubes 148e increases gradually from the center of rotation to the radial outer side. That is, the adjacent branch arm tubes 148e in the vicinity of the center of rotation close to the rotating shaft 45a are relatively densely formed with a small gap formed therebetween, and while approaching the radial outer side, the adjacent branch arm tubes 148e are relatively non-densely formed with a large gap formed therebetween.

The reason for this is as follows: in a case where the rotating structural body 144 rotates at a predetermined rotation speed in the direction of arrow R, since the absorption liquid spouts much strongly from the branch arm tubes 148e as the branch arm tubes are positioned close to the radial outer side due to the magnitude of a centrifugal force, the density of the formation of the branch arm tubes 148e is set to gradually decrease from the center of rotation close to the rotating shaft 45a to the radial outer side so that the absorption liquid can much more equally spout in the rotational radial direction. The structure of other configurations (including the rotating structural body 144 in the container 41) in the vicinity of the heat exchanger 43 is the same as in that of the absorber 40 (refer to FIG. 2) of the first embodiment.

According to the modification example of the first embodiment, it is possible to obtain the following effects.

That is, according to the modification example of the first embodiment, as described above, in the configuration of the brush fixing portion 148, the gap between 9 branch arm tubes 148e in the solution movement path 48a increases gradually from the center of rotation close to the rotating shaft 45a to the radial outer side. Accordingly, even when the rotating structural body 144 rotates at the predetermined rotation speed in the direction of arrow R, it is possible to make (equalize) the amount of absorption liquid supplied to the brush portion 49 uniform in the vicinity (having a relatively low centrifugal force) of the center of rotation of the brush fixing portion 148, and the amount of absorption liquid (the amount of liquid sprayed from the branch arm tube 148e) supplied to the brush portion 49 uniform in the vicinity (having a relatively high centrifugal force) on the radial outer side of the brush fixing portion 148. Accordingly, also in the rotational radial direction, it is possible to uniformly apply the absorption liquid to the outer surfaces 42a of the heat transfer tubes 42 which face the rotation region of the rotating structural body 144 (the brush portion 49 (the brush row 49a and the brush row 49b)). Other effects of the modification example of the first embodiment are the same as in the first embodiment.

Second Embodiment

A second embodiment will be described with reference to FIGS. 1, 3, 4, 9, and 10. In the second embodiment, different from the first embodiment in which the heat exchanger 43 is formed by the heat transfer tubes 42 of a total of 96, one heat exchanger 243 is formed by a plurality (6 pieces) of heat exchange container portions 242, each of which has a longitudinal flat cross section (cross section in FIG. 9) at the position of the center line 150 when seen in the Y direction. In the illustration of the drawings, the same reference numbers will be assigned to the same configurations as in the first embodiment.

Figure 9:
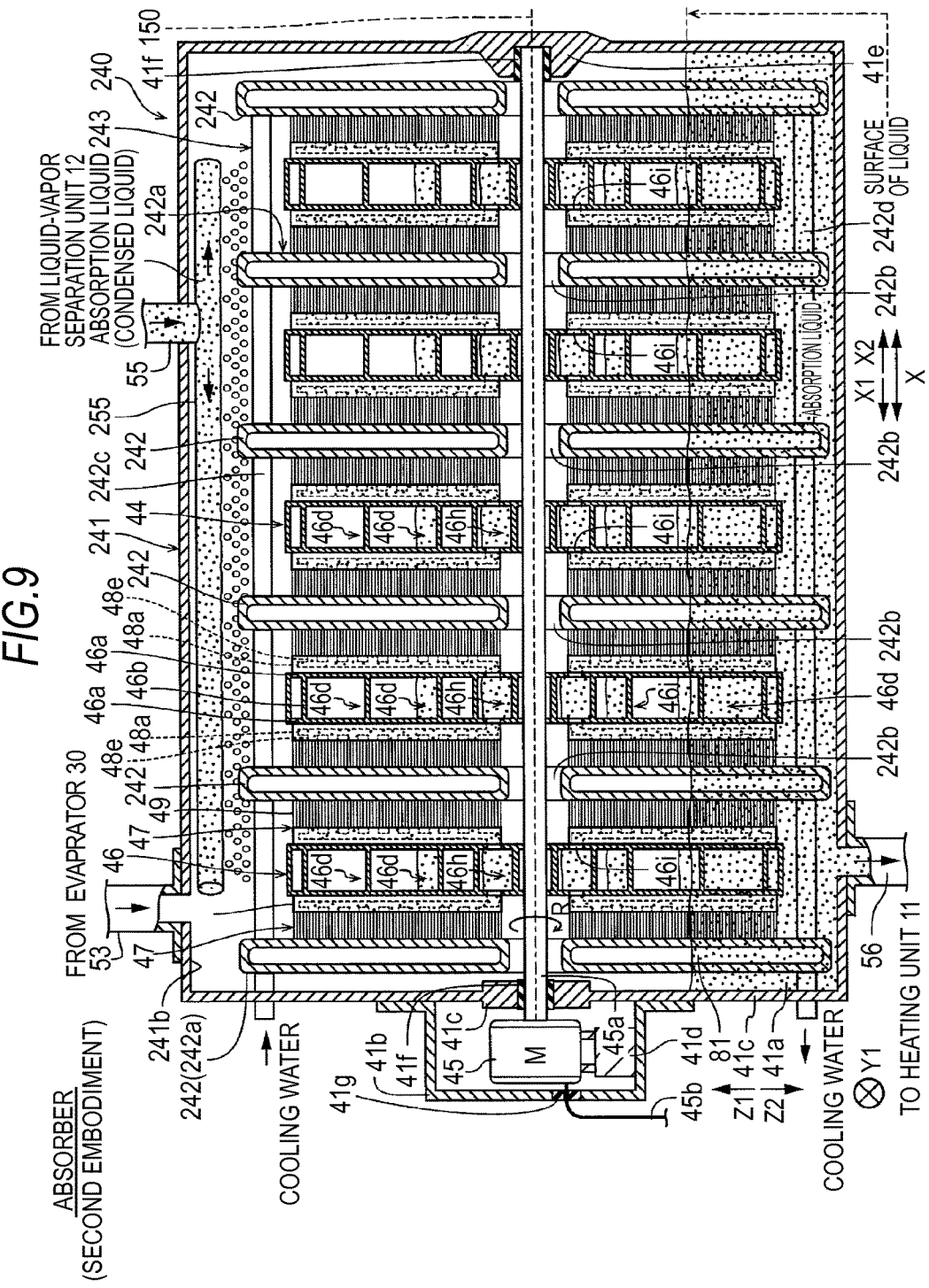
FIG. 9 is a side cross-sectional view illustrating the structure of an absorber of an absorption heat pump apparatus according to a second embodiment of this disclosure.

As illustrated in FIG. 9, an absorption heat pump apparatus according to the second embodiment of this disclosure includes an absorber 240. The absorber 240 includes a container 241 having the liquid storage portion 41a for storing the absorption liquid (mixed solution of condensed liquid and diluted liquid), and the heat exchanger 243 including the plurality (6 pieces) of heat exchange container portions 242, each of which has a longitudinal flat cross section at the position of the center line 150 when seen in the Y direction. The heat exchange container portions 242 extending in the Y direction (in the horizontal direction) are disposed in parallel with each other with an equal pitch held therebetween in the X direction. A flat outer surface 242a of the heat exchange container portion 242 is exposed in the container 241.

Here, each of the heat exchange container portions 242 of the heat exchanger 243 has a pass through portion 242b that passes through substantially the center of the heat exchange container portion 242 in the X direction when seen in an extension direction (in the X direction) of the center line 150. The rotating shaft 45a extends from one side (direction of arrow X1) toward the other side (direction of arrow X2) through the pass through portion 242b of each of the heat exchange container portions 242. Inner and outer sides of a heat transfer wall of the heat exchange container portion 242 are not communicated with each other through the pass through portion 242b, and an internal flow path in the pass through portion 242b is sealed with the heat transfer wall. Accordingly, the cooling water 81 flows in portions of the heat exchange container portion 242, which are positioned above and below the pass through portion 242b. As such, each of the heat exchange container portions 242 has a predetermined thickness in the X direction, and the heat exchange container portion 242 in its entirety is made to have a hollow circular plate shape having the pass through portion 242b.

Figure 10:
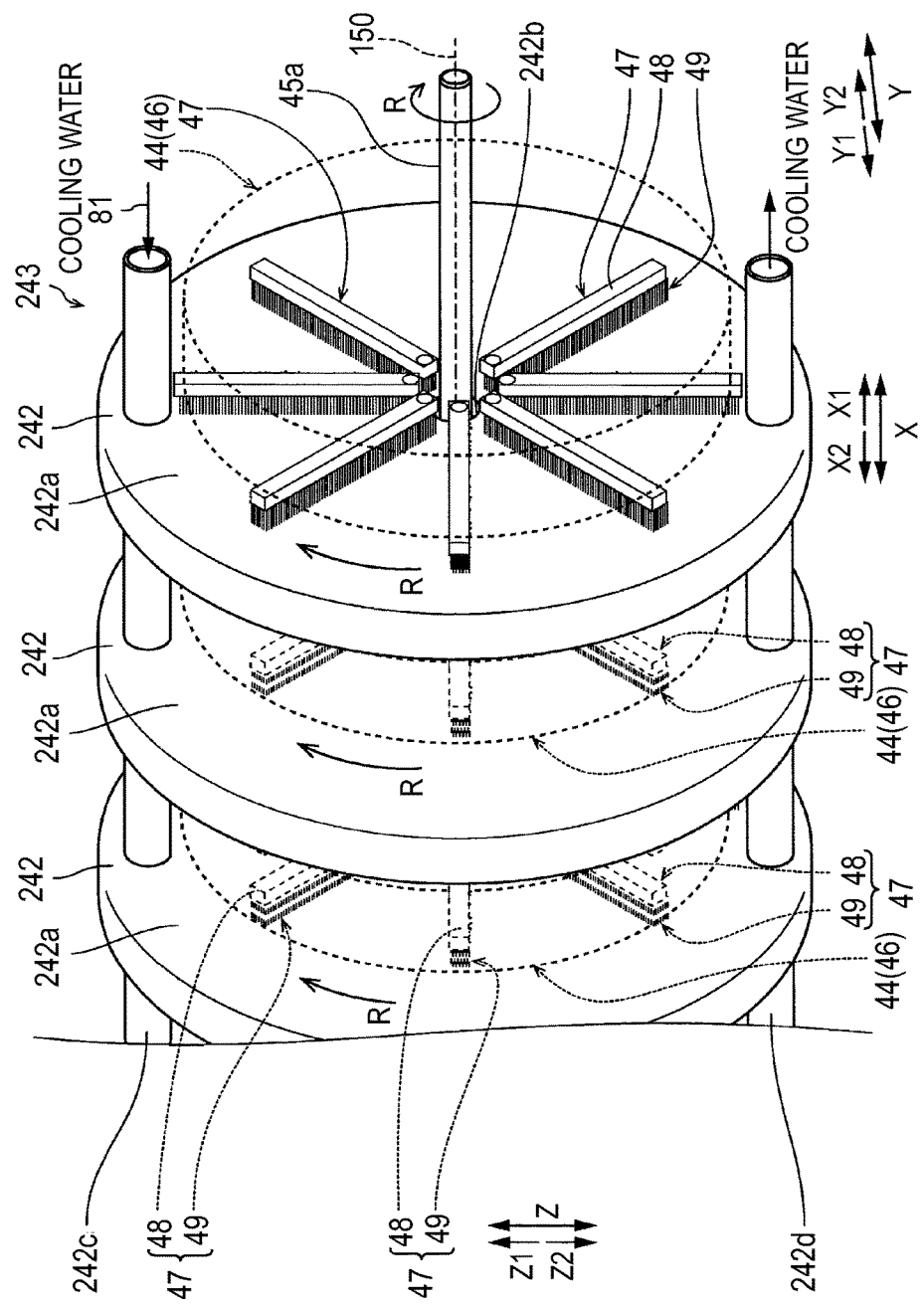
FIG. 10 is a perspective view illustrating the schematic structure of a heat exchanger of the absorber of the absorption heat pump apparatus according to the second embodiment of this disclosure.

As illustrated in FIG. 10, when the outer surfaces 242a are disposed in parallel with a Y-Z plane, the heat exchange container portions 242 line up in the X direction, and are connected to each other through connecting tube portions 242c and connecting tube portions 242d. An end portion of each of the connecting tube portions 242c and 242d in the direction of arrow X1 passes through the side wall portion 41c of the container 241 in the horizontal direction, and then is connected to the circulation tube conduit 82 on the outside (refer to FIG. 1). The cooling water 81 flowing into the connecting tube portion 242c from the circulation tube conduit 82 is distributed to the heat exchange container portions 242 of the heat exchanger 243. The cooling water 81 flows through each of the heat exchange container portions 242 from the direction of arrow Z1 to the direction of arrow Z2, collects in the connecting tube portions 242d, and returns back to the circulation tube conduit 82.

Accordingly, in the second embodiment, as illustrated in FIG. 9, when the rotating structural body 44 is rotated by the motor 45, the absorption liquid pumped upward by the pumping member 46 of the rotating structural body 44 moves to the collecting portion 46h (refer to FIG. 4) at the center of rotation through the opening portions 46c (refer to FIG. 4) and the solution movement paths 46d (the communication holes 46g (refer to FIG. 4)) due to the rotation of the pumping member 46, and then radially moves outward from the center of rotation through the discharge holes 46i and the solution movement path 48a (branch arm tubes 48e). In the heat exchanger 243, the flat outer surface 242a of each of the heat exchange container portions 242 is coated with the absorption liquid, in the form of a thin liquid film, through the brush member 47, while the absorption liquid is supplied from the branch arm tubes 48e of the solution movement path 48a to the root portion 47a (refer to FIG. 3) of the brush member 47.

In the second embodiment, the configuration of the solution supply portion which guides the absorption liquid (condensed liquid) into the container 241 is different from that in the first embodiment. That is, as illustrated in FIG. 9, an injector 255 is attached to the vicinity of an inner ceiling portion 241b of the container 241 of the absorber 240, and has a header portion that has a plurality of sprinkling holes opened in a lower surface thereof. A liquid droplet or mist of absorption liquid (condensed liquid) supplied from the absorption liquid delivery tube conduit 55 is sprinkled into the container 241 through the injector 255.

Accordingly, during a cooling operation, in a state where the absorption liquid (condensed liquid) supplied (suctioned) from the liquid-vapor separation unit 12 (refer to FIG. 1) is sprinkled from an upper side to a lower side (direction of arrow Z1) of the heat exchanger 243, 16 brush members 47 of each of the rotating structural bodies 44 rotate along the outer surfaces 242a of the heat exchange container portions 242 in the direction of arrow R by the driving of the motor 45. Accordingly, when the amount of the absorption liquid in the liquid storage portion 41a is small, the brush portion 49 (the brush row 49a and the brush row 49b) directly absorbs the absorption liquid (condensed liquid) sprinkled from the injector 255, and the outer surfaces 242a of the heat exchange container portions 242 are sequentially coated with the absorption liquid absorbed by the brush portion 49. The absorption liquid (which is not absorbed by the brush portion 49 and naturally falls (drips) into the liquid storage portion 41a) is pumped upward by the rotating pumping member 46 passing through the liquid storage portion 41a, and is applied to the outer surfaces 242a of the heat exchange container portions 242. As such, the flat outer surfaces 242a of the heat exchange container portion 242 is coated, in the form of a thin liquid film, with the absorption liquid sprinkled from the injector 255. Other configurations of the absorption heat pump apparatus according to the second embodiment are the same as in the first embodiment.

In the second embodiment, it is possible to obtain the following effects.

That is, in the second embodiment, as described above, the heat exchanger 243 is formed by connecting the plurality (6 pieces) of heat exchange container portions 242 in the X direction, each of which has a longitudinal flat cross section. While moving to the center of rotation due to the rotation of the pumping member 46, and then radially moving outward from the center of rotation, the absorption liquid pumped upward by the pumping member 46 is applied to the flat outer surfaces 242a of the heat exchanger 243 through the brush member 47. Accordingly, since it is possible to efficiently coat the entirety of the flat outer surfaces 242a of the heat exchanger 243 with the absorption liquid, in the form of a thin liquid film, using the brush member 47, even when the heat exchanger 243 is formed by the heat exchange container portions 242, it is possible to easily maintain the performance of the heat exchanger for cooling the absorption liquid in the absorber 240.

In the second embodiment, the flat outer surface 242a of the heat exchange container portion 242 has a circular shape having the center line 150 as its center. According to the configuration of the heat exchanger 243, the plurality of brush members 47 sequentially rotate along the circular outer surfaces 242a in the direction of arrow R during the rotation of the rotating structural body 44. Accordingly, since the heat exchange container portion 242 is formed so as to overlap the rotation path (circular coating region) of the brush member 47, it is possible to reduce the size of the heat exchanger 243 to the extent that the outer surfaces 242a of the heat exchanger are not required to be excessively exposed to portions in the container 241 other than the rotation path of the brush member 47. Other effects of the second embodiment are the same as in the first embodiment.

Third Embodiment

A third embodiment will be described with reference to FIGS. 1 to 3, and FIG. 11. In the third embodiment, a rotating structural body 344 replaces the rotating structural body 44 (refer to FIG. 2) in the first embodiment, and the rotating structural body 344 is made by assembling one spirally wound cylindrical pumping tube 301 into a pumping member 346. In the illustration of the drawings, the same reference signs will be assigned to the same configurations in the first embodiment.

Figure 11:
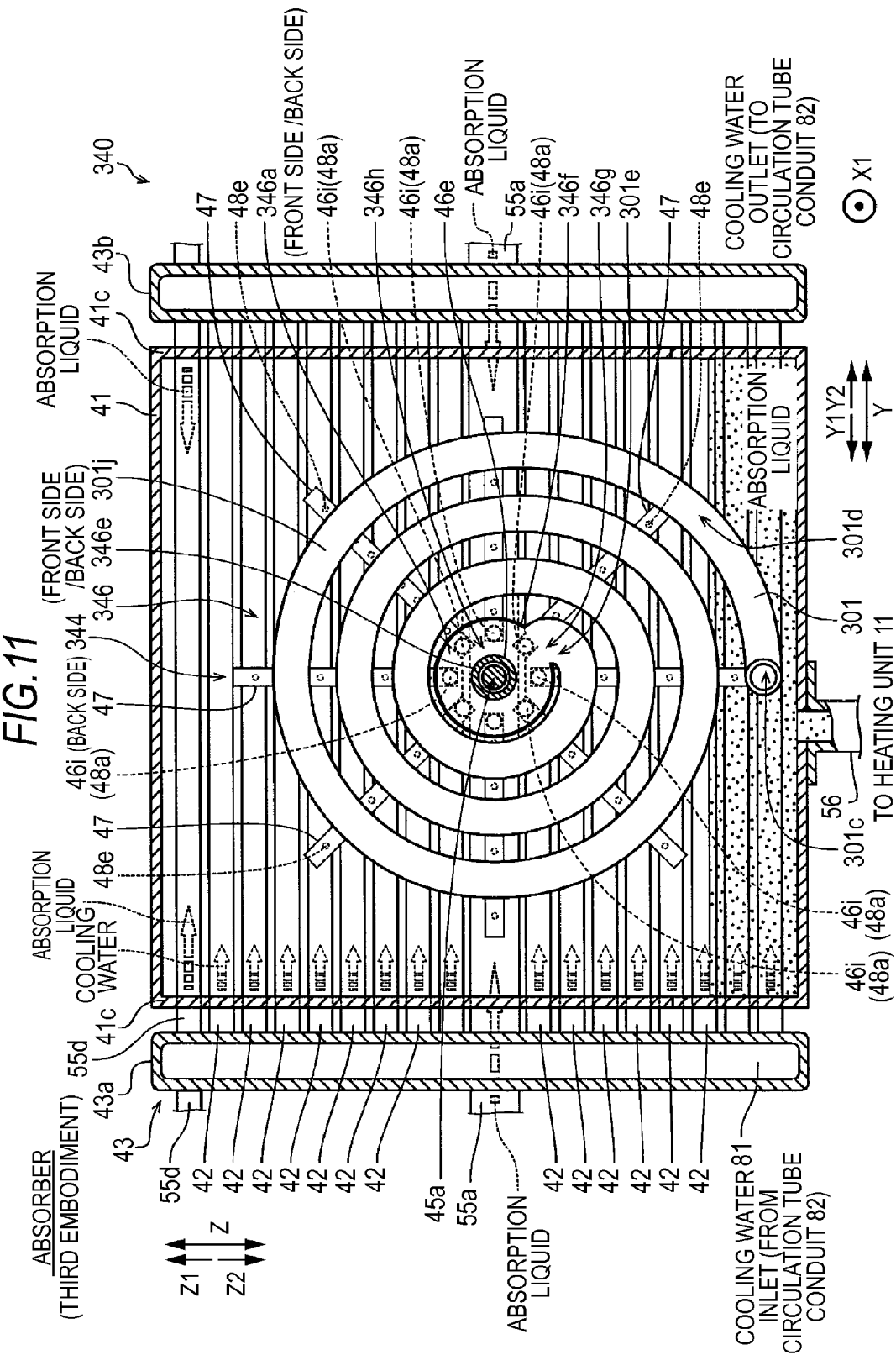
FIG. 11 is a cross-sectional view illustrating the structure of an absorber and a pumping member of an absorption heat pump apparatus according to a third embodiment of this disclosure.

As illustrated in FIG. 11, in an absorption heat pump apparatus according to the third embodiment of this disclosure, an absorber 340 includes the container 41; the rotating structural body 344 that rotates about the center line 150 (refer to FIG. 2) in the container 41; and the motor 45 (refer to FIG. 2) that rotates the rotating structural body 344 in the clockwise direction (in the direction of arrow R) through the rotating shaft 45a.

The rotating structural body 344 has the pumping member 346 that is coaxially fixed to the rotating shaft 45a, and the brush member 47 (refer to FIG. 3 for the detailed structure) that is fixed to the pumping member 346 so as to rotate integrally with the pumping member 346. The pumping member 346 includes one pumping tube 301 that spirally extends from a radial outer side of the pumping member 346 toward the center of rotation, and a collecting portion 346h that is connected to an opening end portion 301e of the pumping tube 301 in the vicinity of the center of rotation. Accordingly, the pumping member 346 is provided with one opening portion 301c of the pumping tube 301, which is opened to the outside, and one solution movement path 301d that spirally extends from the opening portion 301c as its starting point on the radial outer side of the pumping member 346 toward the center of rotation. The opening portion 301c is an example of the "pumping portion" of this disclosure, and the solution movement path 301d is an example of the "first solution passage" of this disclosure.

The solution movement path 301d spirally extends toward the center of rotation while maintaining a cross-sectional flow path area of the opening portion 301c. The collecting portion 346h includes a pair of end plates 346a (one is positioned on a front side of the drawing sheet, and the other is positioned on a back side of the drawing sheet), and a connecting member 346e and a connecting member 346f which connect the pair of end plates 346a in the X direction (in a direction orthogonal to the drawing sheet), and which are coaxially disposed and fixed to the rotating shaft 45a. One communication hole 346g is formed in the connecting member 346f, and the opening end portion 301e of the pumping tube 301 (the solution movement path 301d) is communicated with a ring-shaped spatial portion through the communication hole 346g, and the spatial portion is interposed between the connecting member 346e and the connecting member 346f of the collecting portion 346h. In the third embodiment, the brush members 47 (8 pieces×2 sets) extending radially are attached to outer surfaces 301j of the pumping tube 301 in the direction of arrow X1 (on the front side of the drawing sheet) and in the direction of arrow X2 (on the back side of the drawing sheet).

Accordingly, in the third embodiment, the absorption liquid pumped upward by the pumping member 346 of the rotating structural body 344 moves to the collecting portion 346h at the center of rotation through the opening portion 301c and the solution movement path 301d (the communication hole 346g) due to the rotation of the pumping member 346, and then radially moves (spreads) outward from the center of rotation through the discharge holes 46i and the solution movement path 48a (the branch arm tubes 48e). While being supplied from the branch arm tubes 48e of the solution movement path 48a to the root portion 47a of the brush member 47 (refer to FIG. 3), the absorption liquid is applied, in the form of a thin liquid film, to the outer surfaces 42a of the heat exchanger 43 through the brush member 47. Other configurations of the absorption heat pump apparatus according to the third embodiment are the same as in the first embodiment.

In the third embodiment, it is possible to obtain the following effects.

That is, in the third embodiment, as described above, in the configuration of the pumping member 346, the pumping tube 301 is used which has the opening portion 301c and spirally extends from the radial outer side toward the center of rotation. Accordingly, even when the spirally formed pumping tube 301 is used, it is possible to easily pump the absorption liquid in the liquid storage portion 41a upward, and to coat the outer surfaces 42a of the heat exchanger 43 with the absorption liquid through the brush member 47, while the wettability of the absorption liquid with respect to the outer surface 42a is held.

In the third embodiment, in the configuration of the pumping tube 301, the opening end portion 301e (which spirally extends toward the center of rotation while the cross-sectional flow path area of the opening portion 301c is maintained) is connected to the communication hole 346g of the connecting member 346f. Accordingly, since the opening portion 301c on one side has the same cross-sectional flow path area as that of the opening end portion 301e on the other side (at the outlet), it is possible to smoothly move the absorption liquid pumped upward through the opening portion 301c to the collecting portion 346h through the opening end portion 301e. Accordingly, it is possible to easily and rapidly supply the absorption liquid to the brush member 47. Other effects of the third embodiment are the same as in the first embodiment.

Fourth Embodiment

A fourth embodiment will be described with reference to FIGS. 1, 12, and 13. In the configuration of the fourth embodiment, different from the first embodiment, in addition to the absorber 40, an evaporator 430 for the evaporation of the refrigerant (water) also adopts a configuration in which the refrigerant is pumped upward and supplied to a brush member 437. The brush member 437 is an example of the "coating member" of this disclosure. In the illustration of the drawings, the same reference signs will be assigned to the same configurations as in the first embodiment.

Figure 12:
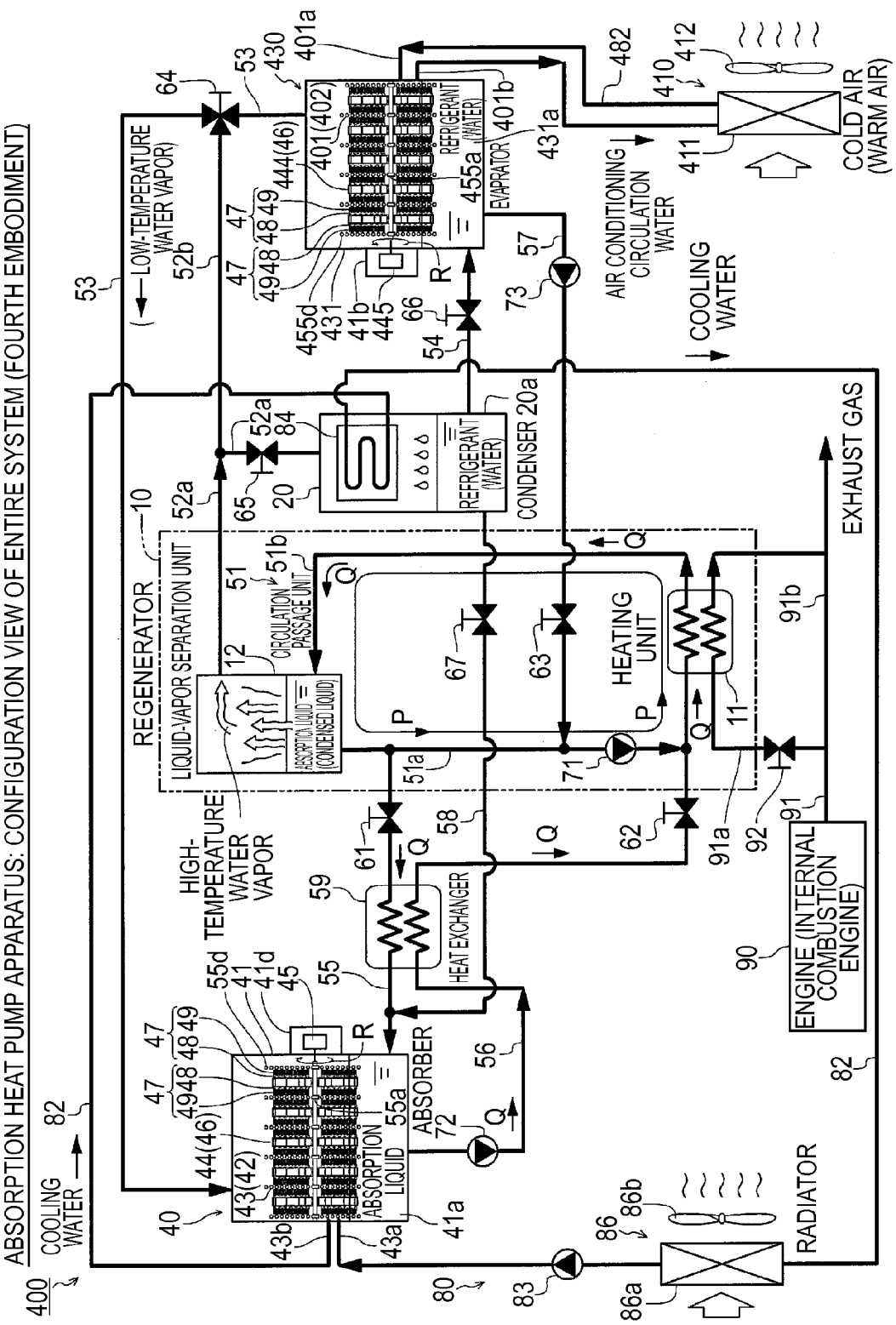
FIG. 12 is a view illustrating the entire configuration of an absorption heat pump apparatus according to a fourth embodiment of this disclosure.

In an absorption heat pump apparatus 400 according to the fourth embodiment of this disclosure, as illustrated in FIG. 12, the evaporator 430 including a rotating structural body 444 and a heat exchanger 401 is provided in replacement of the evaporator 30 (refer to FIG. 1) in the first embodiment. A plurality (16 pieces×6 rows=96 pieces) of straight tube-shaped heat transfer tubes 402 of the heat exchanger 401 are connected to a circulation water tube conduit 482 through a collecting tube 401a and a collecting tube 401b. The circulation water tube conduit 482 for air conditioning is connected to a heat exchange unit 410. In the heat exchange unit 410, air (outside air) blown by a blower 412 is cooled by air conditioning circulation water 481 (refer to FIG. 13) that flows through the heat exchanger (air heat exchange) 411. The cooled air (cool wind) is blown into a vehicle cabin. The air conditioning circulation water 481 is an example of a "heat exchange fluid" of this disclosure.

Figure 13:
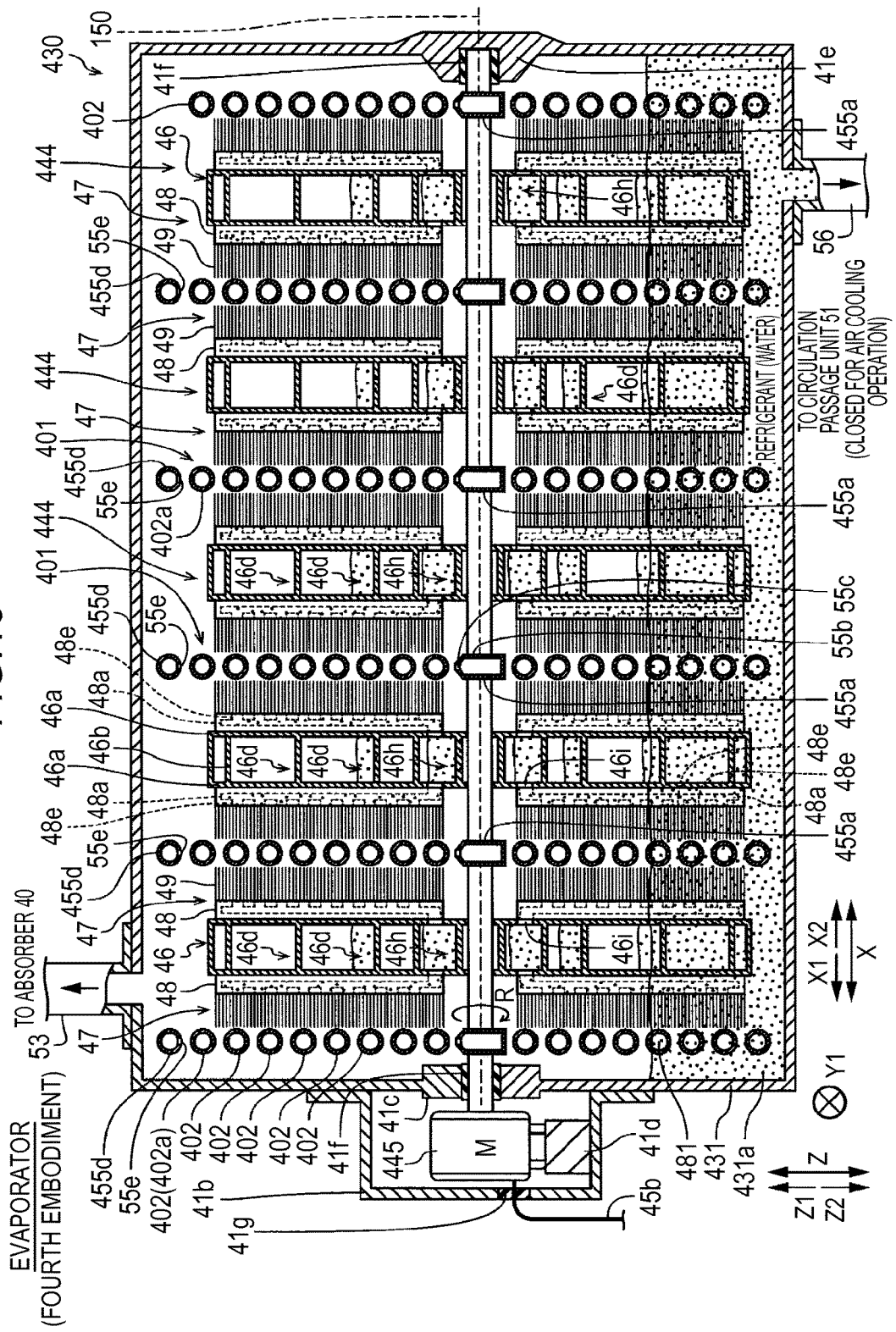
FIG. 13 is a side cross-sectional view illustrating the structure of an evaporator of the absorption heat pump apparatus according to the fourth embodiment of this disclosure.

Accordingly, in the fourth embodiment, as illustrated in FIG. 13, 5 rotating structural bodies 444 are rotated in the direction of arrow R by the drive force of a motor 445, and thereby the refrigerant (water) in a liquid storage portion 431a of the container 431 is pumped upward by the pumping member 46 of each of the rotating structural bodies 444. The refrigerant (water) pumped upward by the pumping member 46 moves to the collecting portion 46h at the center of rotation through the opening portions 46c and the solution movement paths 46d (the communication holes 46g) due to the rotation of the pumping member 46, and then radially moves outward from the center of rotation through the discharge holes 46i and the solution movement path 48a (the branch arm tubes 48e). While the refrigerant (water) is supplied to a root portion of the brush member 437 from 9 branch arm tubes 48e of the solution movement path 48a, outer surface 402a of the heat exchanger 401 is coated with the refrigerant (water) through the brush member 437 in the form of a thin liquid film. That is, the outer surfaces 402a are thin coated with the refrigerant (water) through the brush member 437, and thereby a thin liquid film (water film) is widely formed on the outer surfaces 402a of the heat transfer tubes 402 (the heat exchanger 401) for the refrigerant (water) while the wettability of the refrigerant with respect to the outer surface 402a is well held.

A container 431 includes a solution supply portion 455a that is provided in a rotation path of the brush member 437 of the rotating structural body 444, and that can guide the refrigerant (water) into the container 431 from the outside of the container 431 via the circulation water tube conduit 482, and can supply the refrigerant to the brush member 437. The solution supply portion 455a is provided in the rotation path of the brush member 437 so as to extend along a direction that passes through the center of rotation of the pumping member 46, and along the radial direction of the pumping member 46. The solution supply portion 455a is provided at a height in the vicinity of the center of rotation of the pumping member 46 so as to extend along the horizontal direction and the radial direction of the pumping member 46, and the solution supply portion 455a can supply the refrigerant to the brush member 437 that extends in the radial direction of the pumping member 46. That is, the solution supply portion 455a has the slit 55c that is made by cutting a horizontal slender portion away from the vicinity of the ceiling (region in the direction of arrow Z1) of the solution supply portion 455a. The refrigerant (water) supplied from the circulation water tube conduit 482 to the solution supply portion 455a is directly supplied to the brush portion 49 of the brush member 437 disposed obliquely below the solution supply portion 455a, while spouting from the slit 55c and dripping obliquely downward from the inclined surfaces of the tapered tube wall portion 55b.

As illustrated in FIG. 13, a solution supply portion 455d is provided above the uppermost heat transfer tube 402, and has the plurality of sprinkling holes 55e. The refrigerant (water) supplied to the solution supply portion 455d from the circulation water tube conduit 482 drips downward (is sprinkled) from the plurality of sprinkling holes 55e, and is directly supplied to a row of the heat transfer tubes (8 upper heat transfer tubes 402). Opposite end portions of each of the solution supply portions 455a and 455d in the Y direction pass horizontally through the side wall portions 41c of the container 431, respectively, and are connected to the collecting tube 401a (refer to FIG. 12) and the collecting tube 401b (refer to FIG. 12), respectively.

In the evaporator 430, a thin film (liquid film) of coating refrigerant (water) on the outer surfaces 402a of the heat transfer tubes 402 (the heat exchanger 401) actively evaporates while generating the heat of vaporization, and disappears from the outer surfaces 402a. The outer surfaces 402a of the heat transfer tubes 402 (the heat exchanger 401) are directly coated with the refrigerant (water) that is newly absorbed from the liquid storage portion 431a due to the rotation of the brush member 437. In the evaporator 430, an operation of sequentially coating the outer surfaces 402a of the heat transfer tubes 402 with the refrigerant in the liquid storage portion 431a is repeated during the driving of the motor 445 (during a cooling operation). Other configurations of the absorption heat pump apparatus 400 according to the fourth embodiment are the same as in the first embodiment.

In the fourth embodiment, it is possible to obtain the following effects.

That is, in the fourth embodiment, as described above, the evaporator 430 includes the pumping member 46 that pumps the refrigerant (water) in the liquid storage portion 431a upward using the rotation of the rotating structural body 444, and includes the brush members 437, each of which rotates integrally with the pumping member 46, is provided so as to radially extend outward from the center of rotation of the pumping member 46, and coats the outer surfaces 402a of the heat exchanger 401 with the refrigerant pumped upward by the pumping member 46. While the refrigerant pumped upward by the pumping member 46 of the rotating structural body 444 moves to the center of rotation due to the rotation of the pumping member 46 in the direction of arrow R, and then radially moves outward from the center of rotation, the outer surfaces 402a of the heat exchanger 401 are coated with the refrigerant through the brush members 437. Accordingly, after the refrigerant (water) subjected to heat exchange on the outer surfaces 402a of the heat exchanger 401 falls, and is stored in the liquid storage portion 431a, the pumping member 46 can pump the stored refrigerant upward again, and the brush member 437 can coat the outer surfaces 402a of the heat exchanger 401 with the refrigerant, while the wettability of the absorption liquid with respect to the outer surface 402a is held. That is, since the refrigerant is not allowed to flow to the outside while being not sufficiently subjected to heat exchange, the refrigerant staying in the liquid storage portion 431a can be repeatedly supplied to the heat exchanger 401, and heat exchange can be done between the refrigerant and the air conditioning circulation water 481, it is possible to improve the evaporation performance of the evaporator 430 for evaporating the refrigerant. In other words, it is possible to obtain the amount of heat exchange equivalent to that in the related art even though using the heat exchanger 401 having a smaller size than in the related art.

As described above, since the outer surfaces 402a of the heat transfer tubes 402 of the heat exchanger 401 are coated with the refrigerant (water) in the liquid storage portion 431a through the brush member 437, it is not necessary to install the following configuration in the absorption heat pump apparatus 400 of the fourth embodiment, as in the evaporator 30 (refer to FIG. 1) of the first embodiment: the refrigerant (water) in the liquid storage portion 31a is suctioned by the pump 35 installed on the outside of the container 431, and is sprayed (sprinkled) to the top of the heat exchange unit 32 in the container 31 through the refrigerant delivery tube conduit 34 (refer to FIG. 1). Accordingly, it is possible to reduce the size of the absorption heat pump apparatus 400. As a result, it is possible to reduce the size of the absorption heat pump apparatus 400 while maintaining the heat exchange performance (evaporation performance of refrigerant) of the heat exchanger 401 of the evaporator 430.

In the fourth embodiment, while the refrigerant pumped upward by the pumping member 46 of the rotating structural body 444 moves to the center of rotation due to the rotation of the pumping member 46, and thereafter, radially moves outward from the center of rotation, the brush member 437 coats the outer surfaces 402a of the heat exchanger 401 with the refrigerant. That is, the refrigerant is collected at the center of rotation by effective use of the rotation of the pumping member 46, and thereafter radially spreads (moves) outward from the center of rotation, and thereby it is possible to uniformly spread through the outer surfaces 402a of the heat exchanger 401 with the refrigerant through the brush member 437. Accordingly, heat exchange between the refrigerant and the air conditioning circulation water 481 can be done through the entirety of the outer surfaces 402a of the heat exchanger 401, which corresponds to the rotation path (coating region) of the brush member 437 (the brush portion 49), and thereby it is possible to improve the evaporation performance (radiation performance) of the evaporator 430 for evaporating the refrigerant.

In the fourth embodiment, since the rotating structural body 444 includes the brush member 437 that coats the outer surfaces 402a of the heat exchanger 401 with the refrigerant (water) pumped upward by the pumping member 46, even when the absorption heat pump apparatus 400 is mounted not in stationary equipment such as in facilities but in a moving body such as a vehicle, the outer surfaces 402a of the heat exchanger 401 can be normally coated with the refrigerant pumped upward by the rotating pumping member 46, and thereby the operation of the absorption heat pump apparatus 400 can be performed while being not considerably affected by an inclined state or an excitation state of not only the absorber 40 but also the evaporator 430.

In the fourth embodiment, the evaporator is further provided with the solution supply portion 455a that is provided in the rotation path of the brush member 437, guides the refrigerant (water) into the container 431 from the outside of the container 431, and can supply the refrigerant to the brush member 437. Accordingly, not only it is possible to pump the refrigerant (water) in the liquid storage portion 431a upward and to supply to the brush member 437 using the pumping member 46, but also it is possible to supply the refrigerant guided from the outside of the container 431 directly to the brush member 437 through the solution supply portion 455a. Even in a case where the absorption heat pump apparatus 400 is mounted in a moving body such as a vehicle, since the refrigerant can be directly supplied to the rotating brush member 437 through the solution supply portion 455a, not only the performance of the absorber 40 but also the performance of the evaporator 430 can be maintained while being not considerably affected by an inclined state or an excitation state of the absorption heat pump apparatus 400.

In the fourth embodiment, the solution supply portion 455a is provided in the rotation path of the brush member 437 so as to extend along the radial direction of the pumping member 46. Accordingly, it is possible to reliably supply the refrigerant (water) directly to the brush member 437 (which rotates integrally with the pumping member 46 and radially extends to the outside) through the solution supply portion 455a that extends along the extension direction of the brush member 437. Other effects of the fourth embodiment are the same as in the first embodiment.

The embodiments disclosed in this specification are exemplary embodiments in all the aspects, and this disclosure is not limited to the embodiments. The scope of this disclosure is determined by not the above-mentioned embodiments, but the scope of the appended claims, and all modifications are included in the scope of this disclosure insofar as the modifications have meaning and scope equivalent to those of the appended claims.

For example, in the first to fourth embodiments, water and a lithium bromide (LiBr) aqueous solution are respectively used as a refrigerant and as absorption liquid; however, this disclosure is not limited to those in the embodiments. For example, this disclosure may be applied to an absorption heat pump apparatus that uses ammonia and water as a refrigerant and absorption liquid, respectively.

According to the modification example of the first embodiment, in the configuration of the brush fixing portion 148, the radial gap between 9 branch arm tubes 148e in the solution movement path 48a increases gradually from the center of rotation to the radial outer side; however, this disclosure is not limited to this configuration in the modification example. In an example of the configuration of the brush fixing portion 148, the inner diameter of the branch arm tube 148e may be set to decrease gradually from the center of rotation to the radial outer side while the gap between 9 branch arm tubes 148e in the solution movement path 48a remains constant. Even in this case, it is possible to minimize unbalance in the amount of spout of the adsorption liquid in the rotational radial direction originating from a centrifugal force. The number of branch arm tubes 148e may be another numeral other than 9.

According to the second embodiment, in the configuration of the solution supply portion, the injector 255 is attached to the vicinity of the ceiling portion 241b of the container 241, and the absorption liquid is sprinkled from the injector 255; however, this disclosure is not limited to the configuration in the embodiment. For example, a non-rotating tube member (solution supply portion) may be inserted between the rotating shaft 45a and the pass through portion 242b while being coaxial with the rotating shaft 45a, and the absorption liquid (condensed liquid) may be guided into a spatial portion between an outer surface of the rotating shaft 45a and an inner surface of the tube member. At this time, among the tube members (the solution supply portions) that extend in the X direction, hole portions (short slit portions) or the like may be provided in an apex portion (apex portion in the direction of arrow Z1) of the tube member at positions (10 places in FIG. 2) in which the brush member 47 intersects the rotating shaft 45a, and the absorption liquid (condensed liquid) may spout into the container 41 through the hole portion or the like. Principally, the absorption liquid (condensed liquid) supplied to the brush member 47 (the brush portion 49) in the vicinity of the center of rotation radially moves outward due to a centrifugal force originating from the rotation of the brush member 47, and is supplied to the entirety of the brush member 47. When the absorber 240 includes the heat exchanger 243 (refer to FIG. 10), the "solution supply portion" of this disclosure is preferably formed as illustrated in the modification example.

In the third embodiment, in the configuration of the pumping member 346, one pumping tube 301 extending spirally is used; however, this disclosure is not limited to this configuration in the embodiment. That is, the "pumping member" of this disclosure may be made by spirally and sequentially winding and integrally forming a plurality (for example, 4 pieces) of the pumping tubes 301 having a phase difference of approximately 90°. At this time, since 4 opening portions 301c ("pumping portion" of this disclosure) are provided so as to be opened to the liquid storage portion 41a, it is possible to increase the amount of pumping-up of the absorption liquid to that extent.

In the fourth embodiment, in the configuration of the heat exchanger 401 of the evaporator 430, the plurality of heat transfer tubes 402 having a circular cylindrical cross section are used; however, this disclosure is not limited to this configuration in the embodiment. That is, similar to the heat exchanger 243 of the absorber 240 illustrated in the second embodiment, in the configuration of the heat exchanger 401 of the evaporator 430, the plurality (6 pieces) of heat exchange container portions 242 having a longitudinal flat cross section may be used.

According to the first to fourth embodiments, in the configuration of the brush member 47 (147, 437), the brush portion 49 formed of resin fibers is used; however, this disclosure is not limited to this configuration in the embodiments. That is, the "coating member" of this disclosure may be made of a material which allows the coating of the outer surfaces 42a (242a, 402a) of the heat transfer tubes 42 (342, 402, and the heat transfer container portion 242) while easily absorbing liquid and easily releasing (discharge) retained (absorbed) liquid. For example, the coating member may be made of a sponge-like material having a porous structure.

According to the first, the second and the fourth embodiments, in the configuration of the rotating structural body 44 (144, 444), 8 brush members 47 (the brush fixing portions 48 and 148) radially extending with a gap of approximately 45° held therebetween are attached to the outer surface 46j of the platelike member 46a positioned opposite to (positioned in the direction of arrow X1 and in the direction of arrow X2) the blade members 46b; however, this disclosure is not limited to this configuration in the embodiments. For example, the brush members 47 (brush fixing portions 48) may be attached to the rotating structural body 44 (144, 444), with a gap of approximately 30°, approximately 60°, or approximately 90° about the center line 150 held therebetween. Even in the configuration of the rotating structural body 344 according to the third embodiment, the brush members 47 (brush fixing portions 48) may be attached to the outer surface 301j of the pumping tube 301, with a gap of approximately 30°, approximately 60°, or approximately 90° about the center line 150 held therebetween.

According to the first, the second and the fourth embodiments, in the configuration of the rotating structural body 44 (144, 444), the pumping member 46 made of stainless steel is used; however, this disclosure is not limited to the material in the embodiments. For example, the pumping member 46 may be made of a composite resin material having good corrosion resistance against the absorption liquid, for example, polyvinyl chloride (PVC), or may be made of an aluminum alloy.

According to the first to fourth embodiments, in the configuration of the brush member 47 (437), the brush fixing portion 48 made of stainless steel is used; however, this disclosure is not limited to the material in the embodiments. For example, the brush fixing portion 48 may be made of a composite resin material having good corrosion resistance against the absorption liquid, for example, polyvinyl chloride (PVC), or may be made of an aluminum alloy.

According to the first to fourth embodiments, the rotating structural body 44 rotates in the configuration in which the rotating shaft 45a connected to the motor 45 passes through the side wall portion 41c of the container 41, and extends into the container 41, and the pumping member 46 is coaxially fixed to the rotating shaft 45a; however, this disclosure is not limited to this configuration in the embodiments. For example, a magnetic rotator is attached to a rotating shaft of the motor 45 on the outside of the container 41, and a magnet is attached to an end surface portion of the rotating shaft 45a which is held to be rotatable only in the container 41. The rotator of the motor 45 and the end surface portion of the rotating shaft 45a are disposed very close to each other with the side wall portion 41c of the container 41 interposed therebetween, and the rotating shaft 45a may be rotated by using torque that is produced when the rotator of the motor 45 and the end surface portion of the rotating shaft 45a pull each other due to a magnetic force. Accordingly, since the motor 45 is completely separated from the inside of the container 41, it is not necessary to provide the sealing member 41f in the container 41, and it is possible to much reliably hold the sealability (vacuum state) of the container 41. The rotating structural body 44 may be rotated by connecting a large-diameter pulley and a small-diameter pulley to the motor 45 and the rotating shaft 45a, respectively, and driving the large-diameter pulley and the small-diameter pulley to rotate via a belt.

According to the first embodiment, the modification example of the first embodiment, and the third embodiment, one heat exchanger 43 is made by disposing 6 the heat transfer tubes in the X direction (in the horizontal direction) in which the rotating shaft 45a extends (here, a row of the heat transfer tubes is formed by disposing 16 heat transfer tubes 42 (8 pieces for upper and lower two stages each) in the vertical direction (in the Z direction)); however, this disclosure is not limited to this configuration in the embodiments. The number of stages and the number of rows of the heat transfer tube 42 having a circular cylindrical cross section may be set to numerals other than those in the embodiments. That is, it is possible to appropriately change the number of stages or the number of rows of the heat transfer tube 42, depending on the performance of the absorber 40 (140, 340). Even in the heat exchanger 401 of the evaporator 430 of the fourth embodiment, the number of heat transfer tubes 402 (the number of stages and the number of rows) may be set to numerals other than those in the embodiment.

In the second embodiment, the heat exchanger 243 is made by disposing 6 heat exchange container portions 242 having a flat cross-sectional flow path in the X direction (in the horizontal direction) in which the rotating shaft 45*a* extends; however, this disclosure is not limited to this configuration in the embodiment. The number of heat exchange container portions 242 (the number of heat exchange container portions 242 in the X direction) may be set to another numeral other than that in the embodiment. That is, it is possible to appropriately change the number of heat exchange container portions 242, depending on the performance of the absorber 240.

In the fourth embodiment, heat exchange between the refrigerant (water) and the air conditioning circulation water 481 is done by allowing the air conditioning circulation water 481 to flow through the heat exchanger 401 of the evaporator 430; however, this disclosure is not limited to this configuration in the embodiment. For example, similar to a method of using the evaporator 30 in the first embodiment, an absorption heat pump apparatus may be configured in such a manner that heat exchange between the refrigerant (water) and air for air conditioning is done in the evaporator 430 by allowing air for air conditioning to directly flow through the heat exchanger 401. Also with this configuration, the coating refrigerant (water) applied to the outer surfaces 402*a* of the heat transfer tubes 402 using the brush member 47 evaporates efficiently, and air for air conditioning flowing through the heat transfer tubes 402 is efficiently cooled. The air for air conditioning flowing through the heat exchanger 401 is an example of the "heat exchange fluid" of this disclosure.

According to the first embodiment, the modification example of the first embodiment, the third embodiment, and the fourth embodiment, the outer surfaces 42*a* (402*a*) of the heat transfer tubes 42 (402) (each heat transfer tube is formed of an element tube (bare tube)) are coated with the absorption liquid or the refrigerant through the brush member 47, and according to the second embodiment, the flat and circular outer surfaces 242*a* of the heat exchange portion 242 are coated with the absorption liquid through the brush member 47; however, this disclosure is not limited to these configurations in the embodiments. For example, in order to increase a heat transfer area, a heat exchanger may adopt a flat heat transfer tube, the outer surface of which has tiny convexities and concavities, and the inside of which is divided into a plurality of flow paths using partition walls.

In the first to fourth embodiments, the "absorption heat pump apparatus" of this disclosure is applied to an air conditioning system for a vehicle such as a passenger vehicle, a bus, or a truck equipped with an engine (internal combustion engine); however, this disclosure is not limited to the example of application in the embodiment. For example, the "absorption heat pump apparatus" may be applied to an air conditioning system for a train, a ship, or the like equipped with a diesel engine. This disclosure can be not applied only to a moving body such as a vehicle, but also can be widely applied to a stationary absorption heat pump apparatus for air conditioning in a building, a factory, commercial facilities, or the like. In this disclosure, a plurality of combinations of the heat exchanger and the rotating structural body including the pumping member and the coating member may be provided in the absorber or the evaporator, depending on the scale of an air conditioning system.

In the first to fourth embodiments, the absorption liquid is heated by using the heat of exhaust gas from the engine (internal combustion engine); however, this disclosure is not limited to that in the embodiment. For example, the "absorption heat pump apparatus" of this disclosure may be applied to an air conditioning system for a hybrid vehicle that is driven by the combination of an engine and an electric motor, or an air conditioning system for an electric vehicle that is driven by an electric motor, or an air conditioning system for a passenger vehicle having a fuel cell system. That is, a heat source for heating the absorption liquid may be not only exhaust gas of an engine, but also waste heat of a battery or a motor in an electric vehicle, waste heat originating from the generation of fuel cells, or the like.

In the first to fourth embodiments, water and a lithium bromide (LiBr) aqueous solution are respectively used as a refrigerant and as absorption liquid; however, this disclosure is not limited to those in the embodiments. For example, this disclosure may be applied to an absorption heat pump apparatus that uses ammonia and water as a refrigerant and absorption liquid, respectively.

An aspect of this disclosure is directed to an absorption heat pump apparatus that absorbs refrigerant vapor using absorption liquid, the apparatus including: a container that has a liquid storage portion which stores a solution made of absorption liquid or a refrigerant; a heat exchanger which is installed in the container, and through which a heat exchange fluid flows; a pumping member that pumps the solution in the liquid storage portion upward using the rotation thereof; and a coating member that rotates integrally with the pumping member, and is provided so as to radially extend outward from the center of rotation of the pumping member, and coats an outer surface of the heat exchanger with the solution pumped upward by the pumping member. While the solution pumped upward by the pumping member moves to the center of rotation due to the rotation of the pumping member, and then radially moves outward from the center of rotation, the outer surface of the heat exchanger is coated with the solution through the coating member.

According to the aspect of this disclosure, the absorption heat pump apparatus includes the pumping member that pumps the solution made of absorption liquid or a refrigerant in the liquid storage portion upward using the rotation thereof, and the coating member that rotates integrally with the pumping member, and is provided so as to radially extend outward from the center of rotation of the pumping member, and while the solution pumped upward by the pumping member moves to the center of rotation due to the rotation of the pumping member, and then radially moves outward from the center of rotation, the outer surface of the heat exchanger is coated with the solution through the coating member. Accordingly, after the solution subjected to heat exchange on the outer surface of the heat exchanger falls, and is stored in the liquid storage portion, the pumping member can pump the stored solution (absorption liquid or refrigerant) upward again, and the coating member can coat the outer surface of the heat exchanger with the solution. That is, since the solution is not allowed to flow to the outside while being not sufficiently subjected to heat exchange, the solution staying in the liquid storage portion can be repeatedly supplied to the heat exchanger, and heat exchange can be done between the solution and the heat exchange fluid, it is possible to improve the performance of the heat exchanger (the cooling performance of the absorber for cooling the absorption liquid or the evaporation performance of an evaporator for evaporating the refrigerant). In other words, it is possible to obtain the amount of heat exchange equivalent to that in the related art even though using the heat exchanger having a smaller size than in the related art. In this case, since the rotating pumping member is provided in the container, it is not necessary to install a circulation pump (solution pump) for circulating the solution and a solution circulation circuit in the absorption heat pump apparatus, or it is not necessary to provide a countermeasure for preventing a cavity phenomenon originating from the use of the circulation pump. Accordingly, it is possible to reduce the size of the absorption heat pump apparatus. As a result, it is possible to reduce the size of the absorption heat pump apparatus while maintaining the performance of the heat exchanger.

In the absorption heat pump apparatus according to the aspect of this disclosure, while the solution pumped upward by the pumping member moves to the center of rotation due to the rotation of the pumping member, and thereafter, radially moves outward from the center of rotation, the coating member coats the outer surface of the heat exchanger with the solution. That is, the solution is collected at the center of rotation by effective use of the rotation of the pumping member, and thereafter radially spreads (moves) outward from the center of rotation, and thereby it is possible to uniformly spread through the outer surface of the heat exchanger with the solution through the coating member. Accordingly, heat exchange between the solution (absorption liquid or refrigerant) and the heat exchange fluid can be done through the entirety of the outer surface of the heat exchanger, which corresponds to the rotation path (coating region) of the coating member, and thereby it is possible to improve the performance of the heat exchanger.

According to the aspect of this disclosure, since the absorption heat pump apparatus includes the coating member that coats the outer surface of the heat exchanger with the solution pumped upward by the pumping member, even when the absorption heat pump apparatus is mounted not in stationary equipment such as in facilities but in a moving body such as a vehicle, the outer surface of the heat exchanger can be normally coated with the solution pumped upward by the rotating pumping member, and thereby the operation of the absorption heat pump apparatus can be performed while being not considerably affected by an inclined state or an excitation state of the apparatus. The outer surface of the heat exchanger (heat transfer tubes) is coated with the solution (absorption liquid or refrigerant) through the coating member which radially extends outward from the center of rotation of the pumping member, and thereby it is possible to easily form thin liquid films over a wide range, and it is not necessary to add a surfactant or the like to the solution and to prevent a decrease in the surface tension of the solution. Accordingly, in the absorption heat pump apparatus, it is possible to delete maintenance work for adding a surfactant to the absorption liquid, and thereby it is possible to increase maintenance intervals to that extent.

In the absorption heat pump apparatus according to the aspect of this disclosure, it is preferable that the pumping member includes a pumping portion that is provided on a radial outer side; a first solution passage through which the solution pumped upward by the pumping portion moves from the radial outer side to the center of rotation due to the rotation of the pumping member; and a second solution passage which is provided on an outer surface of the pumping member, and through which the solution moving to the center of rotation through the first solution passage moves to the radial outer side. With this configuration, it is possible to more easily pump the solution in the liquid storage portion upward through the pumping portion that is provided on the radial outer side of the rotating pumping member, and it is possible to easily move the solution (which is pumped upward due to the rotation of the pumping member) from the radial outer side to the center of rotation through the first solution passage. Since it is possible to easily move (spread) the solution (which moves to the center of rotation through the first solution passage and the second solution passage that is provided on the outer surface of the pumping member) outward in the radial direction by virtue of a centrifugal force originating from the rotation of the pumping member, it is possible to easily coat the entirety of the outer surface of the heat exchanger with a thin liquid film through the coating member, while radially moving the solution outward from the center of rotation.

In the configuration in which the pumping member includes the pumping portion and the first solution passage, it is preferable that the pumping member includes a pair of platelike members, and blade portions that are interposed between the pair of platelike members, and spirally extend from the radial outer side of the pumping member toward the center of rotation, and the pumping portion and the first solution passage are formed by the pair of platelike members and the blade portions extending spirally. With this configuration, the portion of the pumping member formed by a pair of the platelike members and the spirally extending blade portions can easily form a rotating structural body (pumping portion and the first solution passage) that pumps the solution in the liquid storage portion upward, and moves the solution to the center of rotation of the pumping member. In particular, since the first solution passage is spirally formed, it is possible to easily move (spread) the solution pumped upward (trapped) by the pumping portion to the center of rotation of the pumping member by effective use of the rotation motion of the pumping member.

In this case, it is preferable that a plurality of pairs of the blade portions extending spirally are provided with a gap held therebetween, and the pumping portion and the first solution passage are formed by the pair of platelike members and the adjacent blade portions extending spirally. With this configuration, one spiral first solution passage is formed of the portion made by a pair of the platelike members and the adjacent two blade portions spirally extending, and the spiral first solution passage guides the solution to the center of rotation of the pumping member. Since the plurality of pairs of the pumping portions and the spiral first solution passage are provided about a rotating shaft of the pumping member, it is possible to continuously pump the solution (absorption liquid or refrigerant) of the liquid storage portion upward through each of the pumping portions and the first solution passages during the rotation of the pumping member. Accordingly, since it is possible to continuously perform an operation of pumping the solution upward, and an operation of supplying the solution to the outer surface of the heat exchanger in the container, it is possible to improve the performance of the heat exchanger to that extent. Different from the configuration in which one spiral first solution passage is provided, since during the rotation of the pumping member, the plurality of first solution passages rotate sequentially while being separated by a predetermined gap of a rotation angle from each other, it is possible to prevent the entire weight of the pumping member from being unbalanced, and as a result, it is possible to prevent the unbalance of weight from causing vibration or the like in the container. A load on a rotating drive unit which rotates the pumping member can be reduced to the extent that the balance of weight is held.

In the configuration in which the pumping member includes the pumping portion and the first solution passage, it is preferable that the pumping member includes a solution discharge hole which is provided in the vicinity of the center of rotation of the pumping member, and through which the solution, which is pumped upward and moves to the center of rotation, is discharged to the second solution passage. With this configuration, it is possible to easily move the solution pumped upward via the pumping portion from the first solution passage to the second solution passage through the discharge hole. At this time, it is possible to release (discharge) not only the solution but also vapor components (refrigerant vapor) (which is taken in during a pumping-up operation) in the container to the second solution passage through the solution discharge hole. Accordingly, even when vapor components are likely to be taken in due to a high rotation speed of the pumping member, it is possible to appropriately ensure the amount of pumped solution.

In the configuration in which the pumping member includes the pumping portion and the first solution passage, it is preferable that a coating member fixing portion is provided so as to radially extend outward from the center of rotation of the pumping member, and fixes the coating member, and the coating member fixing portion includes the second solution passage. With this configuration, it is possible to provide the second solution passage (for moving the solution to the radial outer side and supplying the solution to a root portion of the coating member) on the outer surface of the pumping member by effective use of the coating member fixing portion for fixing the coating member. Since the coating member fixing portion is also used as the second solution passage, it is possible to prevent an increase in the number of components of a moving portion in the container, compared to when the coating member fixing portion and the second solution passage are separately provided.

In the configuration in which the coating member fixing portion is further provided, it is preferable that a plurality of solution supply holes are radially provided in the second solution passage so as to supply the solution to the coating member. With this configuration, when the solution moves from the center of rotation to the radial outer side through the second solution passage due to a centrifugal force, the solution can be supplied to the root portion of the coating member while being discharged through each of the plurality of solution supply holes. Accordingly, it is possible to easily supply the solution (which is pumped upward by the pumping member) to the entire radial region of the coating member.

In the configuration in which the coating member fixing portion is further provided, it is preferable that a plurality of the coating member fixing portions are provided in the pumping member so as to radially extend with a gap of a predetermined angle held therebetween. With this configuration, since the plurality of coating member fixing portions (the second solution passages) radially extending with a gap of a predetermined angle held therebetween sequentially rotate, it is possible to supply a large amount of the solution to the coating members and to coat the outer surface of the heat exchanger compared to when one coating member fixing portion (one second solution passage) is provided.

In the aspect of this disclosure, it is preferable that the absorption heat pump apparatus further includes a solution supply portion that is provided in a rotation path of the coating member, and can guide the solution into the container from the outside of the container, and can supply the solution to the coating member. With this configuration, since not only the solution in the liquid storage portion can be pumped upward and supplied to the coating member by the pumping member, but also the solution (absorption liquid or refrigerant) can be guided from the outside of the container and be directly supplied to the coating member through the solution supply portion, the recoating solution and the solution newly supplied from the outside are mixed in the container, and thereby the concentration of the solution can be held in an appropriate range. Accordingly, in a case where the container of this disclosure is used as the absorber, since the absorber can be brought into operation with the concentration of the absorption liquid held in an appropriate range, it is possible to improve the performance (the cooling performance to cool the absorption liquid) of the absorber. Accordingly, it is possible to easily reduce the size of the absorber. Even in a case where the absorption heat pump apparatus is mounted in a moving body such as a vehicle, since the solution (absorption liquid or refrigerant) can be directly supplied to the rotating coating member through the solution supply portion, the performance of the absorber or the performance of the evaporator can be maintained while being not considerably affected by an inclined state or an excitation state of the apparatus.

In this case, it is preferable that the solution supply portion is provided in the rotation path of the coating member so as to extend along the radial direction of the pumping member. With this configuration, it is possible to reliably supply the solution (absorption liquid or refrigerant) directly to the coating member (which rotates integrally with the pumping member and extends to the radial outer side) through the solution supply portion that extends along the extension direction of the coating member.

In this disclosure, the absorption heat pump apparatus according to the aspect may have the following configurations.

Supplementary Note 1

That is, in the absorption heat pump apparatus according to the aspect, a lower portion of the pumping member is immersed in the liquid storage portion. With this configuration, in a case where the "pumping member" of this disclosure is applied to the absorber in the absorption heat pump apparatus, since the lower portion of the pumping member is normally immersed in the solution (absorption liquid) of the liquid storage portion, the lower portion of the pumping member is more cooled than the portions (portions other than the lower portion) of the pumping member not immersed in the liquid storage portion. Accordingly, it is possible to cool (radiate) the solution while the solution (absorption liquid) is pumped upward and moves to the center of rotation due to the rotation of the cooled portion of the pumping member. Accordingly, it is possible to further improve the cooling performance of the absorption liquid.

Supplementary Note 2

In the absorption heat pump apparatus according to the aspect, the heat exchanger includes a plurality of tube portions that extend along a horizontal direction with a predetermined gap vertically held therebetween. Accordingly, the use of the plurality of tube portions can facilitate the configuration of the heat exchanger. That is, in a state where the plurality of cylindrical heat transfer tubes (tube portions) line up, and a wider heat transfer area (outer surface) of the heat exchanger is ensured, it is possible to efficiently coat the outer surface of the heat exchanger with the solution (absorption liquid or refrigerant) using the coating member.

According to the aspects of this disclosure, as described above, it is possible to reduce the size of an absorption heat pump apparatus while maintain the performance of a heat exchanger.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An absorption heat pump apparatus that absorbs refrigerant vapor using absorption liquid, the apparatus comprising:
    a container that has a liquid storage portion which stores a solution made of absorption liquid or a refrigerant;
    a heat exchanger which is installed in the container, and through which a heat exchange fluid flows;
    a pumping member that pumps the solution in the liquid storage portion upward using the rotation thereof; and
    a coating member that rotates integrally with the pumping member, and is provided so as to radially extend outward from the center of rotation of the pumping member, and coats an outer surface of the heat exchanger with the solution pumped upward by the pumping member,
    wherein while the solution pumped upward by the pumping member moves to the center of rotation due to the rotation of the pumping member, and then radially moves outward from the center of rotation, the outer surface of the heat exchanger is coated with the solution through the coating member.

2. The absorption heat pump apparatus according to claim 1,
    wherein the pumping member includes a pumping portion that is provided on a radial outer side; a first solution passage through which the solution pumped upward by the pumping portion moves from the radial outer side to the center of rotation due to the rotation of the pumping member; and a second solution passage which is provided on an outer surface of the pumping member, and through which the solution moving to the center of rotation through the first solution passage moves to the radial outer side.

3. The absorption heat pump apparatus according to claim 2,
    wherein the pumping member includes a pair of platelike members, and a blade portion that is interposed between the pair of platelike members, and spirally extends from the radial outer side of the pumping member toward the center of rotation, and
    wherein each of a plurality of the pumping portions and each of a plurality of the first solution passages are formed by the pair of platelike members and the blade portion extending spirally.

4. The absorption heat pump apparatus according to claim 3,
    wherein a plurality of the blade portions extending spirally are provided with a gap held therebetween, and
    wherein the pumping portion and the first solution passage are formed by the pair of platelike members and the adjacent blade portions extending spirally.

5. The absorption heat pump apparatus according to claim 2,
    wherein the pumping member includes a solution discharge hole which is provided in the vicinity of the center of rotation of the pumping member, and through which the solution pumped upward and moving to the center of rotation is discharged to the second solution passage.

6. The absorption heat pump apparatus according to claim 2, further comprising:
    a coating member fixing portion that is provided so as to radially extend outward from the center of rotation of the pumping member, and fixes the coating member,
    wherein the coating member fixing portion includes the second solution passage.

7. The absorption heat pump apparatus according to claim 6,
    wherein a plurality of solution supply holes are radially provided in the second solution passage so as to supply the solution to the coating member.

8. The absorption heat pump apparatus according to claim 6,
    wherein a plurality of the coating member fixing portions are provided in the pumping member so as to radially extend with a gap of a predetermined angle held therebetween.

9. The absorption heat pump apparatus according to claim 1, further comprising:
    a solution supply portion that is provided in a rotation path of the coating member, and can guide the solution into the container from the outside of the container, and can supply the solution to the coating member.

10. The absorption heat pump apparatus according to claim 9,
    wherein the solution supply portion is provided in the rotation path of the coating member so as to extend along the radial direction of the pumping member.

* * * * *